United States Patent
Rehof et al.

(10) Patent No.: US 7,703,077 B2
(45) Date of Patent: Apr. 20, 2010

(54) PROGRAMMING MODEL TO DETECT DEADLOCKS IN CONCURRENT PROGRAMS

(75) Inventors: Jakob Rehof, Redmond, WA (US); James R. Larus, Mercer Island, WA (US); Sriram K. Rajamani, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1968 days.

(21) Appl. No.: 10/136,596

(22) Filed: Apr. 30, 2002

(65) Prior Publication Data

US 2003/0204641 A1 Oct. 30, 2003

(51) Int. Cl.
- G06F 9/44 (2006.01)
- G06F 11/00 (2006.01)
- G06F 3/00 (2006.01)

(52) U.S. Cl. .................. 717/127; 717/104; 717/124; 714/38; 719/313

(58) Field of Classification Search ......... 717/104–105, 717/124–135; 719/313–317; 714/37, 38
See application file for complete search history.

(56) References Cited

U.S. PATENT DOCUMENTS

| | | | | |
|---|---|---|---|---|
| 4,318,182 A | * | 3/1982 | Bachman et al. | 718/105 |
| 5,388,189 A | | 2/1995 | Kung | 706/45 |
| 5,434,975 A | * | 7/1995 | Allen | 719/312 |
| 5,548,756 A | | 8/1996 | Tantry et al. | 707/10 |
| 5,572,733 A | | 11/1996 | Ryu et al. | 717/104 |
| 5,586,323 A | | 12/1996 | Koizumi et al. | 395/705 |
| 5,590,276 A | | 12/1996 | Andrews | 395/182.04 |
| 5,590,334 A | * | 12/1996 | Saulpaugh et al. | 719/315 |
| 5,682,537 A | * | 10/1997 | Davies et al. | 710/200 |
| 5,729,738 A | * | 3/1998 | Watanabe et al. | 707/103 R |
| 5,734,903 A | * | 3/1998 | Saulpaugh et al. | 719/316 |
| 5,748,959 A | * | 5/1998 | Reynolds | 718/106 |
| 5,754,860 A | | 5/1998 | McKeeman et al. | 395/704 |
| 5,758,160 A | | 5/1998 | McInerney et al. | 717/104 |
| 5,758,161 A | * | 5/1998 | Reynolds | 718/108 |
| 5,812,824 A | | 9/1998 | Dearth et al. | 395/500 |
| 5,960,200 A | | 9/1999 | Eager et al. | 717/147 |
| 5,991,538 A | | 11/1999 | Becker | 717/140 |

(Continued)

OTHER PUBLICATIONS

Minoura, Toshimi, "Deadlock Avoidance Revisited," 1982, ACM, p. 1023-1048.*

(Continued)

*Primary Examiner*—Wei Y Zhen
*Assistant Examiner*—Qing Chen
(74) *Attorney, Agent, or Firm*—Merchant & Gould PC

(57) ABSTRACT

Described are embodiments for developing a message-passing application program. The program is constructed using stages having a plurality of asynchronous functions, or operations. The operations communicate with other operations of other message-passing programs in a distributed computing environment. The operations also communicate with other operations on other stages of the message-passing application. In order to reduce deadlock errors, a behavioral type signature is appended to the declaration of each operation of the message-passing application program. The behavioral type signature specifies behavioral properties for each operation, such as when an operation should send a message to another operation. A type checker utilizes typing rules and the behavioral type signature to extract an implementation model of each function. The type checker then compares the implementation model to the behavioral type signature to determine whether the asynchronous function conforms to the behavioral type signature.

37 Claims, 8 Drawing Sheets

U.S. PATENT DOCUMENTS

| | | | | |
|---|---|---|---|---|
| 6,012,081 | A | * | 1/2000 | Dorn et al. ................... 718/102 |
| 6,118,448 | A | | 9/2000 | McMillan et al. ............ 717/217 |
| 6,158,045 | A | | 12/2000 | You ............................... 717/4 |
| 6,226,666 | B1 | * | 5/2001 | Chang et al. ................. 709/202 |
| 6,233,620 | B1 | | 5/2001 | Gish ............................ 709/203 |
| 6,253,252 | B1 | * | 6/2001 | Schofield ..................... 719/315 |
| 6,266,805 | B1 | | 7/2001 | Nwana et al. ................ 717/104 |
| 6,275,871 | B1 | * | 8/2001 | Reinfelder et al. .......... 719/328 |
| 6,275,980 | B1 | | 8/2001 | Uchihira et al. ................. 717/4 |
| 6,295,515 | B1 | | 9/2001 | Kurshan et al. ............... 703/13 |
| 6,314,555 | B1 | | 11/2001 | Ndumu et al. ............... 717/101 |
| 6,385,659 | B1 | * | 5/2002 | Tuel, Jr. ....................... 719/313 |
| 6,385,724 | B1 | | 5/2002 | Beckman et al. ............. 713/167 |
| 6,385,765 | B1 | | 5/2002 | Cleaveland et al. ............. 717/8 |
| 6,405,363 | B1 | | 6/2002 | Carlson et al. ............... 717/100 |
| 6,412,018 | B1 | * | 6/2002 | Tuel, Jr. ....................... 719/313 |
| 6,415,332 | B1 | * | 7/2002 | Tuel, Jr. ....................... 719/313 |
| 6,421,681 | B1 | | 7/2002 | Gartner et al. .......... 707/103 R |
| 6,438,745 | B1 | | 8/2002 | Kanamaru et al. .......... 717/137 |
| 6,487,665 | B1 | | 11/2002 | Andrews et al. ............. 713/201 |
| 6,529,932 | B1 | * | 3/2003 | Dadiomov et al. .......... 718/101 |
| 6,535,864 | B1 | | 3/2003 | Zahn ............................ 706/47 |
| 6,546,443 | B1 | | 4/2003 | Kakivaya et al. ............ 710/200 |
| 6,553,438 | B1 | * | 4/2003 | Coffman et al. ............... 710/52 |
| 6,574,736 | B1 | | 6/2003 | Andrews ..................... 713/201 |
| 6,593,940 | B1 | * | 7/2003 | Petersen et al. ............. 715/700 |
| 6,631,362 | B1 | | 10/2003 | Ullman et al. ................ 706/60 |
| 6,698,012 | B1 | | 2/2004 | Kossatchev et al. ......... 717/126 |
| 6,742,006 | B2 | | 5/2004 | Raduchel et al. ............ 707/200 |
| 6,813,761 | B1 | | 11/2004 | Das et al. ..................... 717/132 |
| 6,826,579 | B1 | | 11/2004 | Leymann et al. ............ 717/131 |
| 6,842,894 | B1 | | 1/2005 | Havemose ................... 717/148 |
| 6,850,979 | B1 | * | 2/2005 | Saulpaugh et al. .......... 709/225 |
| 6,889,379 | B1 | | 5/2005 | Lindhorst et al. ........... 719/313 |
| 6,904,588 | B2 | | 6/2005 | Reddy et al. ................ 717/104 |
| 6,904,590 | B2 | | 6/2005 | Ball et al. .................... 717/132 |
| 6,907,395 | B1 | | 6/2005 | Hunt et al. ..................... 703/21 |
| 6,925,466 | B2 | * | 8/2005 | Jensen et al. .................. 707/10 |
| 6,944,848 | B2 | | 9/2005 | Hartman et al. ............. 717/124 |
| 6,961,925 | B2 | | 11/2005 | Callahan, II et al. ........ 717/128 |
| 6,968,535 | B2 | | 11/2005 | Stelting et al. .............. 717/104 |
| 6,981,249 | B1 | | 12/2005 | Lnoblock et al. ............ 717/141 |
| 6,986,117 | B1 | | 1/2006 | Teig et al. ....................... 716/7 |
| 7,013,465 | B1 | * | 3/2006 | Taylor et al. ................. 719/313 |
| 7,016,966 | B1 | * | 3/2006 | Saulpaugh et al. .......... 709/230 |
| 7,055,065 | B2 | | 5/2006 | Farchi et al. ................... 714/38 |
| 7,058,955 | B2 | * | 6/2006 | Porkka ........................ 719/314 |
| 7,089,317 | B2 | * | 8/2006 | Jeyaraman et al. .......... 709/230 |
| 7,203,924 | B2 | | 4/2007 | Rehof et al. |
| 7,526,750 | B2 | | 4/2009 | Andrews et al. ............. 717/104 |
| 2002/0004848 | A1 | * | 1/2002 | Sudarshan et al. .......... 709/310 |
| 2002/0004850 | A1 | * | 1/2002 | Sudarshan et al. .......... 709/313 |
| 2002/0010781 | A1 | | 1/2002 | Tuatini ........................ 709/227 |
| 2002/0144233 | A1 | | 10/2002 | Chong et al. ................. 717/105 |
| 2002/0178401 | A1 | | 11/2002 | Ball et al. ...................... 714/38 |
| 2003/0005181 | A1 | * | 1/2003 | Bau et al. ..................... 709/330 |
| 2003/0167333 | A1 | | 9/2003 | Kumar et al. ................ 709/227 |
| 2003/0204570 | A1 | * | 10/2003 | Rehof et al. ................. 709/207 |
| 2003/0204834 | A1 | | 10/2003 | Ball et al. .................... 717/106 |
| 2004/0172638 | A1 | | 9/2004 | Larus et al. .................. 719/328 |
| 2006/0031750 | A1 | | 2/2006 | Waldorf et al. ............ 715/501.1 |

OTHER PUBLICATIONS

Serbedzija, Nikola B., "Asynchronous Communication on Occam," 1988, ACM, p. 51-62.*

Steele Jr., Guy L., "Making Asynchronous Parallelism Safe for the World," 1990, ACM, p. 218-231.*

Abadi, M. and Lamport, L., "Composing Specifications", *ACM Transactions on Programming Languages and Systems*, 15(1):73-132, 1993.

Abadi, M. and Lamport, L., "Conjoining Specifications", *ACM Transactions on Programming Languages and Systems*, 17(3):507-534, 1995.

Agha, Gul A., *Actors: A Model of Concurrent Computation in Distributed Systems*, The MIT Press, 1988.

Alur, R. and Henzinger T., "Reactive Modules", *Proceedings of the 11th Annual Symposium on Logic in Computer Science*, pp. 207-218, IEEE Computer Society Press, 1996.

Alur, R., Henzinger, T., Kupferman, O. and Vardi, M., "Alternating Refinement Relations", *Concur 98: Concurrency Theory*, LNCS 1466, pp. 163-178, Springer-Verlag, 1998.

Alur, R., Henzinger, T.A., Mang, F.Y.C., Qadeer, S., Rajamani, S.K. and Tasiran, S., Mocha: Modularity in Model Checking, *Computer Aided Verification*, LNCS, pp. 521-525, Springer-Verlag, 1998.

Amtoft, Torben; Nielson, Flemming and Nielson, Hanne R., *Type and Effect Systems, Behaviours for Concurrency*, Imperial College Press, 1999.

Christensen, S., Hirshfeld, Y., and Moller, F., "Decidable Subsets of CCS", *The Computer Journal*, 37(4):233-242, 1994.

Clarke, Edmund M. Jr., Grumberg, Oma, and Peled, Doron A., *Model Checking*, MIT Press, 1999.

Cleaveland, R., Parrow, J., and Steffen, B., "The Concurrency Workbench: A Semantics-Based Tool for the Verification of Concurrent Systems", *ACM Transactions on Programming Languages and Systems*, 15(1):36-72, 1993.

de Alfaro, L. and Henzinger, T., "Interface Theories for Component-Based Design", *EMSOFT 01: Embedded Software*, LNCS, Springer-Verlag, 2001.

Dill, David L., *Trace Theory for Automatic Hierarchical Verification of Speed-Independent Circuits*, MIT Press, 1989.

Dwyer, M., Hatcliff, J., Joehanes, R., Laubach, S., Pasareanu, C., Visser, R.W. and Zheng, H., "Tool-Supported Program Abstraction for Finite-State Verification", *ICSW 01: Software Engineering (to appear)*, 2001.

Eiriksson, A., "The Formal Design of 1M-Gate ASICs", G. Gopalakrishnan and P. Windley, editors, *FMCAD 98: Formal Methods in Computer-Aided Design*, Lecture Notes in Computer Science 1522, pp. 49-63, Springer-Verlag, 1998.

Feret, J., "Confidentiality Analysis of Mobile Systems", *Proceedings of the International Static Analysis Symposium (SAS'00)*, Springer LNCS 1824, 2000.

Flanagan C., and Freund, S.N., "Type-Based Race Detection for Java", *ACM Symposium on Applied Computing*, pp. 219-232, ACM, 2000.

Flanagan, C. and Abadi, M., "Types for Safe Locking", *Proceedings of ESOP 1999*, pp. 91-108, Springer LNCS 1576, 1999.

Fournet, C. and Gonthier, G., "The Reflexive CHAM and the Join-Calculus", *POPL 96: Principles of Programming Languages*, pp. 372-385, ACM, 1996.

Gordon, A. and Jeffrey, A., Typing Correspondence Assertions for Communication Protocols, *MFPS: Mathematical Foundations of Programming Semantics*, pp. 99-120, BRICS Notes Serial NS-01-2, 2001.

Gosling, James; Joy, Bill; Steele, Guy and Bracha, Gilad, *The Java™ Language Specification*, Addison-Wesley, 1996.

Hardin, R., Har'El, Z., Kurshan, R., "COSPAN", *Computer Aided Verification*, LNCS 1102, pp. 423-427, Springer-Verlag, 1996.

Henzinger, T., Liu, X., Qadeer, S., and Rajamani, S., "Formal Specification and Verification of a Dataflow Processor Array", *Proceedings of the International Conference on Computer-Aided Design*, pp. 494-499, IEEE Computer Society Press, 1999.

Henzinger, T., Qadeer, S. and Rajamani, S., You Assume, We Guarantee: Methodology and Case Studies, *CAV 98: Computer Aided Verification*, LNCS 1427, 440-451, Springer-Verlag, 1998.

Henzinger, T.A., Qadeer, S., Rajamani, S.K. and Tasiran, S., "An Assume-Guarantee Rule for Checking Simulation", *FMCAD 98: Formal Methods in Computer-Aided Design*, LNCS 1522, pp. 421-432, Springer-Verlag, 1998.

Hoare, C., *Communicating Sequential Processes*, Prentice Hall, 1985.

Holzmann, G., "The Model Checker SPIN", *IEEE Transactions on Software Engineering*, 23(5):279-295, May 1997.

Holzmann, Gerard J., *Design and Validation of Computer Protocols*, Prentice Hall, 1991.

Holzmann, G., Logic Verification of ANSI-C Code with Spin, *SPIN 00: SPIN Workshop*, LNCS 1885, pp. 131-147, Springer-Verlag, 2000.

Honda, K., Vasconcelos, V.T. and Kubo, M., "Language Primitives and Type Discipline for Structured Communication-Based Programming", *ESOP 98*, Springer, 1998.

Igarashi, A. and Kobayashi, N., "A Generic Type System for the Pi-Calculus", *Proceedings POPL 2001, 28th ACM SIGPLAN-SIGACT Symposium on Principles of Programming Languages, London, UK*, pp. 128-141, Jan. 2001.

Karp, R.M. and Miller, R.E., "Parallel Program Schemata", *Journal of Computer and System Sciences*, 3:147-195, 1969.

Lamport, L., "Proving the Correctness of Multiprocess Programs", *IEEE Transactions on Software Engineering*, SE-3(2):125-143, 1977.

Larsen, K.G. and Milner, R., "A Compositional Protocol Verification Using Relativized Bisimulation", *Information and Computation*, 99:80-108, 1992.

McMillan, K., A Compositional Rule for Hardware Design Refinement, *Computer Aided Verification, CAV '97*, LNCS 1254, pp. 24-35, Springer-Verlag, 1997.

Milner, Robin, *Communicating and Mobile Systems: the π-Calculus*, Cambridge University Press, 1999.

Milner, Robin, "A Theory of Type Polymorphism in Programming", *Journal of Computer and System Sciences*, vol. 17, 1978, pp. 348-375.

Misra, J. and Chandy, K., "Proofs of Networks of Processes", *IEEE Transactions on Software Engineering*, SE-7(4):417-426, 1981.

Najjar, W.A., Lee, E.A. and Gao, G.R., "Advances in the Dataflow Computational Model", *Parallel Computing*, 25:1907-1929, 1999.

Nielson, H.R. and Nielson, F., "Higher-Order Concurrent Programs with Finite Communication Topology", POPL, *ACM Symposium on Principles of Programming Languages*, pp. 84-97, ACM 1994.

Pierce, B.C. and Turner D., Pict: A Programming Language Based on the Pi-Calculus, *Proof, Language and Interaction: Essays in Honour of Robin Milne*, Eds: G. Plotkin, C.P. Stirling and Mads Tofte, MIT Press, 2000.

Puntigam, F. and Peter, C., Changeable Interfaces and Promised Messages for Concurrent Components, *ACM Symposium on Applied Computing*, pp. 141-145, ACM, 1999.

Ravara, A. and Vasconcelos, V., "Typing Non-Uniform Concurrent Objects", *Proceedings of CONCUR 2000*, pp. 474-488, Springer LNCS 1877, 2000.

Roscoe, A.W., *The Theory and Practice of Concurrency*, Prentice Hall, 1998.

Sangiorgi, D., "π-Calculus Internal Mobility, and Agent-Passing Calculi", *Theoretical Computer Science*, 167(2), 1996.

Sangiorgi, D., "A Theory of Bisimulation for the π-Calculus", *Acta Informatica*, pp. 69-97, vol. 33, 1996.

Scaife, N.R., "A Survey of Concurrent Object-Oriented Programming Languages", Technical Report, Heriot-Watt University, 1996.

Schneider, F., "Enforceable Security Policies", *ACM Transactions on Information and System Security*, 3(1):30-50, Feb. 2000.

Stallings, William Ph.D., *Handbook of Computer-Communications Standards*, vol. 2, 2nd Ed., A. Stallings/MacMillan, 1990.

Vardi, M. and Wolper, P., "An Automata-Theoretic Approach to Automatic Program Verification", *LICS 86: Logic in Computer Science*, pp. 332-344, IEEE Computer Society Press, 1986.

Visser, W., Havelund, K., Brat, G. and Park, S., "Model Checking Programs", *ICASE 00: Automated Software Engineering*, 2000.

Yoshida, N., "Graph Types for Monadic Mobile Processes", *FST-TCS: Software Technology and Theoretical Computer Science, LNCS 1180*, pp. 371-387, Springer-Verlag, 1996.

M. Abadi and L. Lamport. The Existence of Refinement Mappings. In LICS 88: Logic in Computer Science, pp. 165-175. IEEE Computer Society Press, 1988.

E. Brinksma, B. Jonsson, and F. Orava. Refining Interfaces of Communicating Systems. In TAPSOFT 91: Theory and Practice of Software Development, LNCS 494, pp. 297-312. Springer-Verlag, 1991.

C. Fournet, F. Le Fessant, L. Maranget, and A. Schmitt. The JoCaml language beta release, documentation and user's manual. Technical report. INRIA, Jan. 2001. Available at pauillac.inria.fr/jocaml/htmlman.

C. Fournet and G. Gonthier. The Join calculus: a language for distributed mobile programming. In Lecture Notes for Applied Semantics Summer School, Caminha Sep. 2000.

Jurjens, "A UML statecharts semntics with message passing," ACM SAC, pp. 1009-1013, 2002.

Mehra et al., "A comparisono f two model based performance prediction techniques for message passing parallel programs," ACM SIGMETRICS, pp. 181-190, 1994.

Chaki et al., "Types as models model checking message passing programs," ACM POPL, pp. 45-47, 2002.

Jarodi et al, "An object passing model for parallel programming," IEEE COMPSAC, pp. 138-143, 2003.

Grieskamp et al., "A schema language for coordinating construction and composition of partial behavior descriptions," ACM SCESM, pp. 59-65, 2006.

Ellis et al., "Extending the behavioral capabilities of the object oriented paradigm with an active model of progation," ACM pp. 319-325, 1990.

Ghelli, "A static type system for message passing," ACM OOPSLA, pp. 129-145, 1991.

Niu et al., "Composale semantics for model based noations," ACM SIGNOFT, pp. 149-158, 2002.

Customer Support Consortium (CSC) and Desktop Management Task Force (DMTF), "Service Incident Exchange Standard," Version 1.1, pp. 1-34. Available at www.dmtf.org.

U.S. Appl. No. 10/779,002, filed Feb. 4, Rehof et al.

U.S. Appl. No. 60/450,982, filed Feb. 3, Larus et al.

U.S. Appl. No. 60/534,884, filed Jan. 4, Andrews.

Alur, et al., "MOCHA: Modularity in Model Checking," Proceedings of the Tenth International Conference on Computer Aided Verification (CAV 98), Lecture Notes in Computer Science 1427, pp. 521-525 (16 pages), Springer-Verlag, 1998.

Andrews et al., "Zing: A Model Checker for Concurrent Software," MSR-TR-2004-10, http://www.research.microsoft.com, 7 pages, 2004.

Andrews et al., "Zing: Exploiting Program Structure for Model Checking Concurrent Software," in CONCUR 2004, http://www.research.microsoft.com/zing/, 15 pages, 2004.

Andrews, et al., "Business Process Execution Language for Web Services, Version 1.1," IBM Corporation and Microsoft Corporation, 136 pages, http://www-106.ibm.com/developerworks/library/ws-bpel/, May 2003.

Baader et al., Term Rewriting and All That, Cambridge University Press, pages 1-301, Aug. 1999.

Ball et al., "The Slam Project: Debugging System Software via Static Analysis," POPL '02, Portland, Oregon, USA, pp. 1-3, Jan. 2002.

Ball, T. et al., "Bebop: A Symbolic Model Checker for Boolean Programs," SPIN 00: SPIN Workshop, LNCS 1885, 20 pages, 2000.

Bharadwaj et al., "Verifying SCR Requirements Specifications Using State Exploration," Proc. First ACM SIGPLAN Workshop on Automatic Analysis of Software, 14 pages, Jan. 1997.

Broder A., "Some Applications of Rabin's Fingerprinting Method," Sequences II: Methods in Communications, Security and Computer Science, pages 1-10, 1993.

Brookes, S.D. et al., "A Theory of Communicating Sequential Processess," Journal of the ACM, 31(3), 560-599, 1984.

Bultan et al., "Model-Checking Concurrent Systems with Unbounded Integer Variables: Symbolic Representations, Approximations, and Experimental Results," ACM Transactions on Programming Languages and Systems, vol. 21, No. 4, pp. 747-789, Jul. 1999.

Bush et al., "A Static Analyzer for finding Dynamic Porgramming Errors," Software—Practice and Experience, vol. 30, pages 775-802, 2000.

Chaki, et al., "Types as Models: Model Checking Message-Passing Programs," In Proceedings, 29th ACM Symposium on Principles of Programming Languages, pp. 45-67 (23 pages), ACM, 2002.

Chinnici, et al., "Web Services Description Language (WSDL) Version 1.2 Part 1: Core Language," W3C Working Draft, http://www.w3.org/TR/2003/WD-wsdl12-20030611/, 103 pages, Jun. 2003.

Chinnici, et al., "Web Services Description Language (WSDL) Version 2.0 Part 1: Core Language," W3C Working Draft, 24 pages, http://www.w3.org/TR/wsdl20/,Nov. 2003.
Cleaveland, et al., "The Concurrency Workbench: A Semantics-Based Tool for the Verification of Concurrent Systems,"ACM Transactions on Programming Languages and Systems, 15(1):36-72, Jan. 1993.
Condit et al., "Region-Based Model Abstraction," Open Source Quality Meeting at U.C. Berkley, 24 pages, Lecture given on Aug. 8, 2003.
Corbett et al., "Bandera: Extracting Finite-State Models from Java Source Code," In Proceedings of the 22nd International Conference on Software Engineering, Ireland, ACM Press, pp. 439-448, 2000.
Curbera, et al., "Business Process Execution Language for Web Services, Version 1.0," IBM Corporation and Microsoft Corporation, 84 pages, ftp://www6.software.ibm.com/software/developer/library/ws-bpell.pdf,Jul. 2002.
Das et al., "ESP: Path-Sensitive Program Verification in Polynomial Time," PLDI'02, Berlin, Germany, pp. 57-68, Jun. 2002.
Dwyer, Matthew et al., "Tool-Supported Program Abstraction for Finite-state Verification," ICSE 01: International Conference on Software Engineering, pp. 1-10, 2001.
"Failures-Divergence Refinement," FDR2 User Manual—Fifth Edition, FDR Version 2.69, Formal Systems (Europe) Ltd., http://www.fsel.com/, 84 pages, May 3, 2000.
"Failures-Divergence Refinement," FDR2 User Manual—Sixth Edition, FDR Version 2.80, Formal Systems (Europe) Ltd., http://www.fsel.com/, 84 pages, May 2, 2003.
Flanagan et al., "Atomizer: A Dynamic Atomicity Checker for Multithreaded Programs," POPL '04, Venice, Italy, pp. 256-267, Jan. 14-16, 2004.
Flanagan et al., "Thread -Modular Verification for Shared-Memory Programs," HP Labs Technical Reports, SRC Technical Note 2001-003, Compaq Computer Corporation, 20 pages, Nov. 19, 2001.
Flanagan et al., "Thread-Modular Verification for Shared-Memory Programs," Lecture Notes in Computer Science, Porceedings of the 11th European Symposium on Programming Languages and Systems, Springer-Verlag, London, UK, 15 pages, 2002.
Flanagan et al., "Transactions for Software Model Checking," Electronic Notes in Theoretical Computer Science, 89(3) 1-22, 2003.
Fournet, C. et al., "Stuck-Free Conformance Theory for CCS," MSR Technical Report-2004-69, 20 pages, Feb. 2004, revised Jul. 2004.
Freund et al., "Checking Concise Specifications for Multithreaded Software," Williams College Technical Note Jan. 2002 (revised Dec. 2003), 16 pages.
Freund et al., "Checking Concise Specifications for Multithreaded Software," FTfJP'2003, Proceedings of the Fifth ECOOP Workshop on Formal Techniquest for Java-like Programs, Darmstadt, Germany, 10 pages, Jul. 21, 2003.
Godefroid, "Model Checking for Programming Languages using VeriSoft," Proceedings of the 24th ACM Symposium on Principles of Programming Languages, pp. 174-186, Paris, Jan. 1997.
Godefroid, "Model-Checking' Software with VeriSoft" © 1996-2004 Bell Laboratories, Lucent Technologies, Apr. 2000, http://cm.bell-labs.com/who/god/verisoft/papers.html, 22 pages, website visited Jan. 12, 2004.
Godefroid, "VeriSoft: A Tool for the Automatic Analysis of Concurrent Reactive Software" Proceedings of the 9th Conference on Computer Aided Verification, Lecture Notes in Computer Science, vol. 1254, pp. 476-479 (5 pages), Springer-Verlag, Haifa, Jun. 1997.
Henzinger et al., "Decomposing refinement proofs using assume-guarantee reasoning," Proceedings of 2000 IEEE/ACM International Conference on Computer-aided Design, pp. 245-252, Nov. 2000.
Hoare, Communicating Sequential Processes, Prentice-Hall International Series in Computer Science, Prentice Hall, pp. i-256, 1985. (260 pages, electronic version 2004, first published in 1985.).
Holzmann, "The Model Checker SPIN," IEEE Transactions on Software Engineering, vol. 23, No. 5, 17 pages, May 1997.
Holzmann, Gerard J., "Logic Verification of ANSI-C code with SPIN," SPIN 00: SPIN Workshop, LNCS 1885, 15 pages, 2000.
Hull, et al., "E-Services: A Look Behind the Curtain," International Conference on Management of Data and Symposium on Principles of Database Systems, Proceedings of the 22nd ACM SIGMOD-SIGNACT-SIGART Symposium on Principles of Database Systems, pp. 1-14, Jun. 2003.
Hunt, James, "Delta Algorithms: An Empirical Analysis," AMC Transactions on Software Engineering and Methodology, 7(2): 192-214, Apr. 1998.
Igarashi, et al., "A Generic Type System for the Pi-Calculus," http://www.sato.kuis.kyoto-u.ac.jp/~igarashi/papers/pdf/genericpi-tcs.pdf,39 pages, Jun. 10, 2003.
Iosif, R., et al., "dSPIN: A Dynamic Extension of SPIN," SPIN 99: SPIN Workshop, LNCS 1680, 16 pages, 1999.
Lamport, "A New Approach to Proving the Correctness of Multiprocess Programs," ACM Transactions on Programming Languages and System, vol. 1, No. 1, pp. 84-97, Jul. 1979.
Larsen et al., "UPPAAL in a Nutshell," International Journal on Softrware Tools for Technology Transfer, 1(1-2), pp. 134-152 (20 pages), Springer-Verlag, 1998.
Larsen, et al., "Bisimulation Through Probabilistic Testing (Preliminary Report)," Proceedings of the 16th ACM SIGPLAN-AIGACT Symposium on Principles of Programming Languages, pp. 344-352, 1989.
Lipton, "Reduction: A Method of Proving Properties of Parallel Programs," Communications of the ACM, vol. 18, No. 12, pp. 717-721, Dec. 1975.
McMillan, "A Compositional Rule for Hardware Design Refinement," In O. Grumberg, editor, CAV 97: Computer Aided Verification, Lecture Notes in Computer Science 1254, 42 pages., Springer-Verlag, 1997.
Milner, Communicating and Mobile Systems: the π-Calculus, Cambridge University Press, pp. i-161, 1999.
Milner, Communication and Concurrency, Prentice-Hall International Series in Computer Science, Prentice Hall, pp. i-260, 1989.
Per Cederqvist et al., "Version Management with CVS (for CVS 1.11.10)," 184 pages, visited http://www.cvshome.org on Feb. 5, 2004.
Qadeer, Shaz et al., "Summarizing Procedures in Concurrent Programs," POPL '04, Jan. 14-16, 11 pages, 2004, Venice, Italy.
Rajamani et al., "Contracts and Futures for Asynchronous Programming (Abstract)," Abstracts of the Software Model Checking Workshop Talks, www.cs.cmu.edu/~svc/talks/SEI-Workshop/abstracts.html, 1 page, available as early as Mar. 19, 2003.
Rajamani, et al., "Abstracts of the Software Model Checking Workshop Talks," http://www.sei.cmu.edu/pacc/smcw/abstracts.html, 3 pages, website visited on Feb. 5, 2004.
Rajamani, et al., "Conference Checking for Models of Asynchronous Message Passing Software," CAV 2002, LNCS 2404, pp. 166-179, 2002.
Rajamani, et al., "Conference Checking for Models of Asynchronous Message Passing Software," Computer Aided Verification: 14th International Conference, CAV 2002, Springer-Verlag, 13 pages, Jul. 2002.
Ramalingam, G., "Context-Sensitive Synchronization Sensitive Analysis is Undecidable," ACM Trans. On Programming Languages and Systems, 22(2) 416-430, Mar. 2000.
Reps et al., "Precise Interprocedural Dataflow Analysis via Graph Reachability," Proceedings of the 22nd ACM SIGPLAN-SIGACT Symposium on Principles of Programming Languages, pp. 49-61, Jan. 1995.
Robby et al., "Bogor: An Extensible and Highly-Modular Software Model Checking Framework," FSE 03: Foundations of Software Engineering, 10 pages, 2003.
Roscoe, The Theory and Practice of Concurrency, Prentice Hall Series in Computer Science, Prentice Hall, pp. i-566, 1998.
Rus et al., "Algebraic Implementation of Model Checking," Proceedings of the 3rd AMAST Workshop on Real-Time Systems held in Salt Lake City, Utah, 20 pages, 1996.
Schneider, "Enforceable Security Policies," ACM Transactions on Information and System Security, vol. 3, No. 1, 18 pages, Feb. 2000.
"Security Protocols," Oxford University Computing Laboratory, http://web.comlab.ox.ac.uk/oucl/work/philippa.broadfoot/securityProtocols.html, 3 pages, website visited on Nov. 18, 2003.

Sharir et al., "Two Approaches to Interprocedural Data Flow Analysis," Program Flow Analysis: Theory and Applications, Prentice-Hall, Inc., pp. 189-233, 1981.

Steffen and Burkart, "Composition, Decomposition and Model Checking of Pushdown Processes," Nordic Journal of Computing, vol. 2, pp. 89-125, 1995.

Stoller, S.D. "Model-Checking Multi-Threaded Distributed Java Programs," pp. 1-25, Sep. 26, 2000.

"Summarizing Procedures in Concurrent Programs," powerpoint presentation presented at ACM Symp on Principles of Programming Languages, 24 pages, 2004.

"Summarizing Procedures in Concurrent Programs," powerpoint presentation presented at Dagstuhl Seminar on Applied Deductive Verification, 37 pages, 2003.

Ugarte et al., "Functional Vector Generation for Assertion-Based Verification at Behavioral Level Using Interval Analysis," IEEE, pp. 102-107, 2003.

Vardi et al., "An Automatia-Theoretic Approach to Automatic Program Verification," in Proc. 1st Sump. On Logic in Computer Science, Cambridge, 18 pages, Jun. 1986.

"VeriSoft Home-Page" © 1996-2004 Bell Laboratories, Lucent Technologies, http://cm.bell-labs.com/who/god/verisoft./,2 pages, website visited on Jan. 12, 2004.

Visser et al., "Model Checking Programs," Proceedings of the 15th International Conference on Automated Software Engineering (ASE), Grenoble, France, 9 pages, Sep. 2000.

Whaley et al., "Compositional Pointer and Escape Analysis for Java Programs," Proceedings of the 14th ACM SIGPLAN, Conference on Object-Oriented Programming, Systems, Languages, and Applications, Denver, Colorado, ACM Press, New York, NY, pp. 187-206, 1999.

Yang et al., "Symbolic Model Checking for Event-Driven Real-Time Systems," ACM Transactions on Programming Languages and Systems, 19(2):386-412, Mar. 1997.

Zing: "A Systematic State Explorer for Concurrent Software," powerpoint presentation, 35 pages, at least as early as Oct. 30, 2005.

Zing: "Exploiting Program Structure for Model Checking Concurrent Software," presented at CONCUR 2004, 50 pages, 2004.

* cited by examiner

PROGRAMMING MODEL TO DETECT DEADLOCKS IN CONCURRENT PROGRAMS

RELATED APPLICATIONS

This application is related to subject matter disclosed in U.S. Patent Application for an "BEHAVIORAL ANALYSIS FOR MESSAGE-PASSING APPLICATION PROGRAMS," Ser. No. 10/136,680, filed concurrently herewith, the subject matter of which is incorporated in this application by reference.

BACKGROUND OF THE INVENTION

Software programming has changed over the years as computer programs have moved away from a sequential model of performing operations and toward a more asynchronous model wherein multiple operations of a single program may be performed substantially simultaneously. These computer programs are typically referred to as "event-driven" programs in that a user may initiate an event in the program and thereafter fail to take any other action with respect to that event for an indefinite period of time. As such, the program is in a waiting pattern in which the program takes no action with respect to this event until the user initiates such. During this interim, the user may initiate any number of other events in the computer program, take any number of other actions with respect to these other events, or perform no action.

Event-driven programs may perform any number of internal operations while waiting for the user to take action with respect to the initiated event or while the user is currently taking action with respect to that or any other event. That is, these programs do not execute tasks and perform operations in a sequential manner, but rather, in a concurrent manner wherein tasks and operations are performed substantially simultaneously with respect to each other. For instance, in a word processor having a graphical user interface, a user may select a control for formatting text in a document using a word processor application program. Meanwhile, between selection of the control and action by the user in the document utilizing the formatting function activated by the control, an auto save feature of the processor may be activated by an internal call initiated by the word processor application. The auto save and formatting operations thus execute logically in a concurrent manner, i.e., "concurrently," with each other in the word processor.

The increasing use of distributed computing environments further illustrates the aforementioned transition in software programming. In distributed computing environments, multiple computer programs communicate with one another by passing messages over channels through which the programs are operably connected using some form of network connection, such a Local Area Network, Wide Area Network, the Internet, or the like. As such, a distributed computing environment may contain various application programs running on multiple computing systems. These application programs are operable to communicate with any number of application programs connected over the same network or possibly another network connection. As such, application programs, or instances thereof, in a distributed computing environment often await communications from other application programs. During this indefinite wait period, the application program may continue to perform operations, such as communicating with other application programs by sending and/or receiving messages. Consequently, application programs operating in a distributed computing environment perform tasks and operations in a concurrent manner that is similar to the event-driven application programs described above.

Collectively, application programs operating in a distributed computing environment and event-driven application programs may be referred to as "concurrent," or "message-passing" applications. Although message-passing applications provide many functional advantages over sequential application programs, message-passing applications are not without problems. One common problem associated with message-passing application is deadlock. Deadlock is an error that may occur in many situations, but most frequently, in situations where an expected action for an operation never occurs. For instance, deadlock occurs when a message sent by a sender (caller) is never received by a receiver (callee). Likewise, deadlock occurs when a receiver waits for a message that is never actually sent by a sender.

Together with deadlock errors, asynchrony and nondeterminism introduced by the unpredictable nature of when message-passing applications may render a specific action make message-passing applications more difficult to write, debug, test and tune than applications operating in a sequential manner. Indeed, today's programming languages and tools currently offer little or no support for concurrent programming. Moreover, there are no current modeling techniques that accurately address the problems of deadlock errors described above.

SUMMARY OF THE INVENTION

In accordance with the present invention, the above and other problems are solved by a system and method for developing message-passing applications that accurately model behavioral properties for the applications. Behavioral type signatures for message-passing operations, i.e., asynchronous functions, of a message-passing application program under development are specified by the application developer. The behavioral type signatures define externally visible behavior for the asynchronous functions on communication channels on which each asynchronous function communicates with one or more other asynchronous functions. The behavioral type signatures are communication protocols that the asynchronous functions follow with respect to input and output actions on the communication channels. During compilation of the message-passing application, a type-checking algorithm may be used to automatically extract an implementation model for each asynchronous function of the message-passing application program and check whether the implementation model conforms to the specified behavioral type signature. The message-passing software application is thus developed such that the code invoking asynchronous functions on a stage of the application does so in correct order and on the appropriate channels, thereby reducing deadlock possibilities.

In accordance with other aspects, the present invention relates to a method for evaluating behavioral properties of a message-passing application. The method includes specifying behavioral type signatures for asynchronous functions on one or more stages in the message-passing application during application development. The behavioral type signatures are process expressions appended to the declaration of each asynchronous function. The behavioral type signatures specify the message-passing behavior on communication channels for each asynchronous function. The method may also include extracting an implementation model for each operation on a stage and thereafter checking whether the implementation model conforms to a specified behavioral type signature. If the implementation model for each asynchronous function on the stage conforms to the specified signature, the method may include creating a report depicting that the functions on the stage are well-typed, thereby reducing the possibility of deadlock errors during execution of the application.

In accordance with yet another aspect of the present invention, a framework and a checking system is provided that allows programmers to relate behavioral type signatures and abstract process models to a source code implementation. The programmers place the behavioral type signatures into the source code being developed. The behavioral type signatures are then used to derive a model from the source code. The model can then be model checked using a conventional model checker. The present invention uses typing rules to define precisely how the behavioral type signatures relate to the source program and how the derived model relates to the source code and the behavioral type signatures.

The invention may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF THE INVENTION

Figure 1:
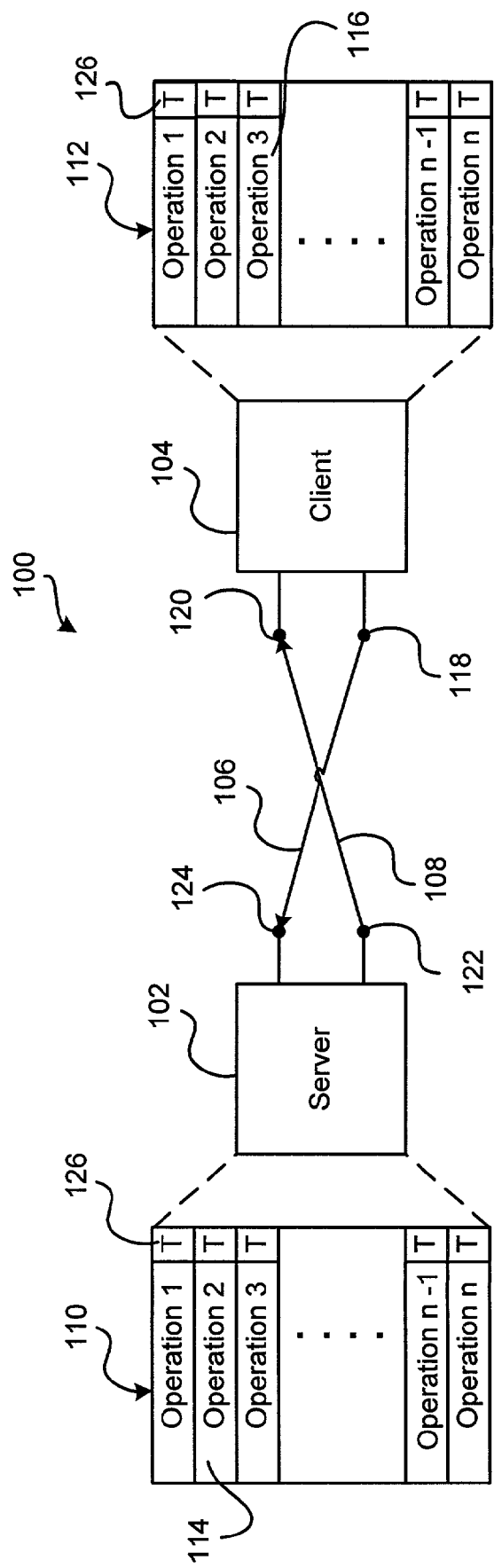
FIG. 1 is a functional diagram of a concurrent computing environment that incorporates aspects of the present invention.

An asynchronous computing environment 100 incorporating aspects of the present invention is shown in FIG. 1. The environment 100 has a server program module 102 and a client program module 104. As described above, the present invention relates to message-passing applications that operate in either a distributed computing environment in accordance with an embodiment or in a local computing environment as event-driven program modules loaded on a single computing system in accordance with another embodiment. Alternative embodiments may comprise elements of both a message passing application in a distributed computing environment and in a local computing environment.

In accordance with a first embodiment, the environment 100 is a distributed computing environment wherein the server program module 102 and the client program module 104 are software application programs resident on separate computing systems that communicate over a form of network connection, such as, without limitation, a Local Area Network (LAN), a Wide Area Network (WAN), the Internet, or the like. For example, the distributed environment 100 may be a workflow environment where the client program module 104 calls the server program module 102 to request performance of a task by the server program module 102. As described in more detail below, an instance (not shown) of the server program module 102 is created in response to the call by the client program module 104. The instance is responsible for performing the task requested by the client program module 104 and thereafter responding to the client program module 104 that the task has been completed. During the time that the client program module 104 waits for a response from the server program module 102, the client program module 104 may make any number of similar calls to other program modules to which the client program module 104 communicates over the network connection. Likewise, any number of other client program modules 104 may contact the server program module 102, create instances of the server program module 102 and communicate with these instances concurrently with the instance created by the client program module 104. For simplicity, though, only the client program module 104 and the server program module 102 are depicted in FIG. 1.

In accordance with a second embodiment of the present invention, the server program module 102 may be an event-driven application program resident on the same computing system as the client program module 104. As such, the server program module 102 and the client program module 104 pass communications over a communication bus resident in the computing environment 100. Communication buses are well known to one of ordinary skill in the computing and communication arts, and therefore not described in detail herein. In this embodiment, as one example, the server program module 102 provides a user with a graphical user interface (GUI) that enables the user to select controls for activating events in the server program module 102. The events, when activated, perform some function or operation within the server program module 102. The user interacts, i.e., selects events, with the GUI of the server program module 102 using a keyboard and/or conventional mouse operably connected to the client program module 104, which in this case, is simply an application program for interpreting keyboard and mouse selections. Upon selection of an event, the client program module 104 calls the operation in the server program module 102 corresponding to the event and an instance of the operation is created to perform the event. Any number of instances of the selected operation or any other operation within the server program module 102 may operate concurrently with one another.

In accordance with an embodiment of the present invention, stages 110 and 112 form the concurrent building blocks for the server and client program modules (102 and 104, respectively). The server application program 102 is built using one or more server stages (such as 110) and the client program module 104 is built using one or more client stages (such as 112). Generally, a stage is a collection of asynchronous functions, which may also be referred to as operations, which share a common memory, together with statements that import operation names from other stages and export operation names to other stages. Operations on separate stages cannot share memory, and thus can only communicate by passing messages therebetween. That is, operations in the client stage 112 communicate with operations in the server stage 110 by sending and receiving asynchronous calls therebetween.

Operations, such as the exemplary server and client asynchronous operations (114 and 116, respectively) shown in FIG. 1, are responsible for providing communication and synchronization mechanisms to connect the server stage 110 to the client stage 112 during communications. Illustrating communications between the server stage 110 and the client stage 112, a client operation 116, referred to as a "caller," makes an asynchronous call to a server operation 114, thereby creating an instance, referred to as a "callee," of the server operation 114. The callee executes operations in parallel, i.e., substantially simultaneously, with the caller. The caller 116 and callee 114 communicate with one another through communication channels referred to as handles, such as a first handle 106 and a second handle 108.

The handles 106 and 108 are specified by the caller 116 in the asynchronous call and may only be used for input, or alternatively, output, by the callee. Indeed, a single handle (106 or 108) may not be used for both input and output by the callee. More specifically, the first handle 106 and the second handle 108 are each declared with usage mode qualifiers indicating whether that handle can be used for input or output by the callee. An input port 120 and an output port 118 provide physical connections that enable the client program module 104, and thus the caller 116 to access the second handle 108 and the first handle 106, respectively. Likewise, an input port 124 and an output port 122 provide physical connections that enable the server program module 102, and thus the callee to access the first handle 106 and the second handle 108, respectively.

In accordance with an embodiment of the present invention, a behavioral type signature 126 is appended to the declaration of each operation, such as operations 114 and 116, within the computing environment 100. A behavioral type signature 126 is a process expression defined by the program module programmer that specifies the message-passing behavior of each operation. That is, behavioral type signatures 126 are communication protocols followed by each operation that define input and output actions on specified handles. In accordance with an embodiment, the behavioral type signature 126 may be appended at the end of the declaration for the operation to which the behavioral type signature 126 is associated. Defining a behavioral type signature 126 for an operation, such as operations 114 and 116, is discussed in further detail with reference to the flow diagrams illustrated in FIGS. 4, 5 and 6. During compilation of the message-passing application, the present invention extracts an implementation model for each operation, such as operations 114 and 116, on a stage, such as stages 110 and 112, and thereafter checks whether the implementation model conforms to its specified behavioral type signature 126. If the implementation model for each operation, such as operations 114 and 116, on the stage, such as stages 110 and 112, conforms to the specified signature, the present invention may create a report depicting that the operations on the stage are well-typed, thereby reducing the possibility of deadlock errors during execution of the application.

Figure 2:
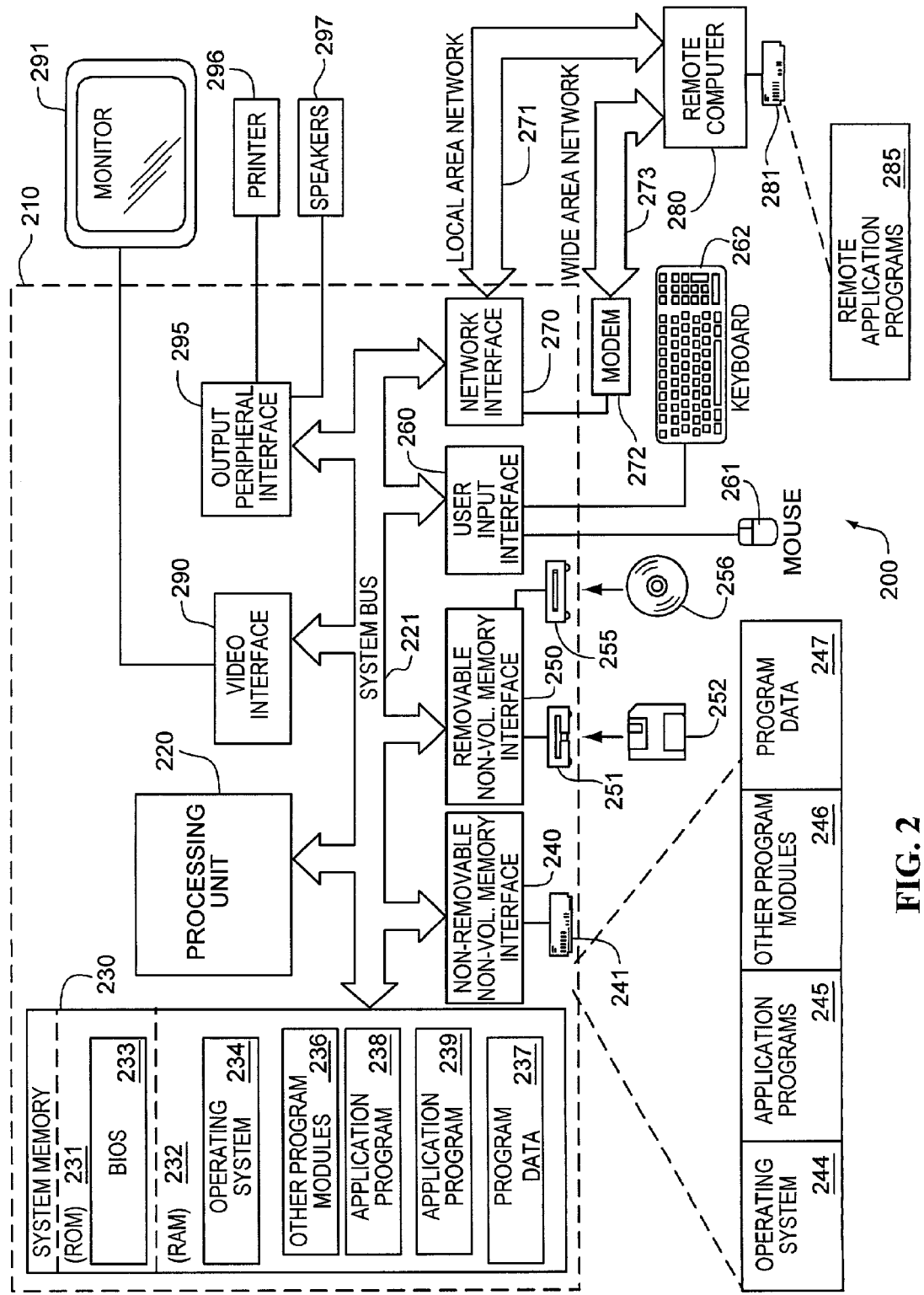
FIG. 2 shows a computer system that may be used according to particular aspects of the present invention.

FIG. 2 illustrates an example of a suitable computing system environment 200 on which the invention may be implemented. The computing system environment 200 is only one example of a suitable computing environment and is not intended to suggest any limitation as to the scope of use or functionality of the invention. Neither should the computing environment 200 be interpreted as having any dependency or requirement relating to any one or combination of components illustrated in the exemplary operating environment 200.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. In accordance with an embodiment, the invention is practiced in a distributed computing environment, such as the environment 100 shown in FIG. 1, in which tasks are performed by remote processing devices that are linked through a communications network. In such a distributed computing environment, program modules may be located in both local and remote computer storage media including memory storage devices.

With reference to FIG. 2, an exemplary system for implementing the invention includes a general purpose computing device in the form of a computer 210. Components of the computer 210 may include, but are not limited to, a processing unit 220, a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 210 typically includes a variety of computer readable media. Computer readable media can be any available media that can be accessed by the computer 210 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 210. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 230 includes computer storage media in the form of volatile and/or nonvolatile memory such as read only memory (ROM) 231 and random access memory (RAM) 232. A basic input/output system 233 (BIOS), containing the basic routines that help to transfer information between elements within the computer 210, such as during start-up, is typically stored in ROM 231. RAM 232 typically contains data and/or program modules that are immediately accessible to and/or presently being operated on by processing unit 220. By way of example, and not limitation, FIG. 2 illustrates an operating system 234, application programs 238 and 239, other program modules 236, and program data 237.

The computer 210 may also include other removable/non-removable, volatile/nonvolatile computer storage media. By way of example only, FIG. 2 illustrates a hard disk drive 240 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 241 is typically connected to the system bus 221 through an non-removable memory interface such as interface 240, and magnetic disk drive 251 and optical disk drive 255 are typically connected to the system bus 221 by a removable memory interface, such as interface 250.

The drives and their associated computer storage media discussed above and illustrated in FIG. 2, provide storage of computer readable instructions, data structures, program modules and other data for the computer 210. In FIG. 2, for example, the hard disk drive 241 is illustrated as storing an operating system 244, application programs 245, other program modules 246, and program data 247. Note that these components can either be the same as or different from the operating system 234, the application programs 238 and 239, the other program modules 236, and the program data 237. The operating system 244, the application programs 245, the other program modules 246, and the program data 247 are given different numbers here to illustrate that, at a minimum, they are different copies. A user may enter commands and information into the computer 210 through input devices such as a keyboard 262 and pointing device 261, commonly referred to as a mouse, trackball or touch pad. Other input devices (not shown) may include a microphone, joystick, game pad, satellite dish, scanner, or the like. These and other input devices are often connected to the processing unit 220 through a user input interface 260 that is coupled to the system bus, but may be connected by other interface and bus structures, such as a parallel port, game port or a universal serial bus (USB). A monitor 291 or other type of display device is also connected to the system bus 221 via an interface, such as a video interface 290. In addition to the monitor, computers may also include other peripheral output devices such as speakers 297 and printer 296, which may be connected through a output peripheral interface 295.

The computer 210 may operate in a networked environment using logical connections to one or more remote computers, such as a remote computer 280. The remote computer 280 may be a personal computer, a server, a router, a network PC, a peer device or other common network node, and typically includes many or all of the elements described above relative to the computer 210, although only a memory storage device 281 has been illustrated in FIG. 2. The logical connections depicted in FIG. 2 include a local area network (LAN) 271 and a wide area network (WAN) 273, but may also include other networks. Such networking environments are commonplace in offices, enterprise-wide computer networks, intranets and the Internet.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the user input interface 260, or other appropriate mechanism. In a networked environment, program modules depicted relative to the computer 210, or portions thereof, may be stored in the remote memory storage device. By way of example, and not limitation, FIG. 2 illustrates remote application programs 285 as residing on memory device 281. It will be appreciated that the network connections shown are exemplary and other means of establishing a communications link between the computers may be used.

Although many other internal components of the computer 210 are not shown, those of ordinary skill in the art will appreciate that such components and the interconnection are well known. Accordingly, additional details concerning the internal construction of the computer 210 need not be disclosed in connection with the present invention.

Those skilled in the art will understand that program modules such as the operating system 234, the application programs 238 and 239, and data 237 are provided to the computer 210 via one of its memory storage devices, which may include ROM 231, RAM 232, the hard disk drive 241, the magnetic disk drive 251 or the optical disk drive 255. As noted above, the hard disk drive 241 is used to store data 237 and programs, including the operating system 234 and the application programs 238 and 239 in accordance with an embodiment of the present invention.

When the computer 210 is turned on or reset, the BIOS 233, which is stored in the ROM 231 instructs the processing unit 220 to load the operating system 244 from the hard disk drive 241 into the RAM 232. Once the operating system 244 is loaded in RAM 232, the processing unit 220 executes the operating system code and causes the visual elements associated with the user interface of the operating system 244 to be displayed on the monitor 291. When a user opens an application program, the program code and relevant data are read from the hard disk drive 241 and stored in RAM 292.

Logical operations of the various embodiments of the present invention are implemented (1) as a sequence of computer implemented steps or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 3:
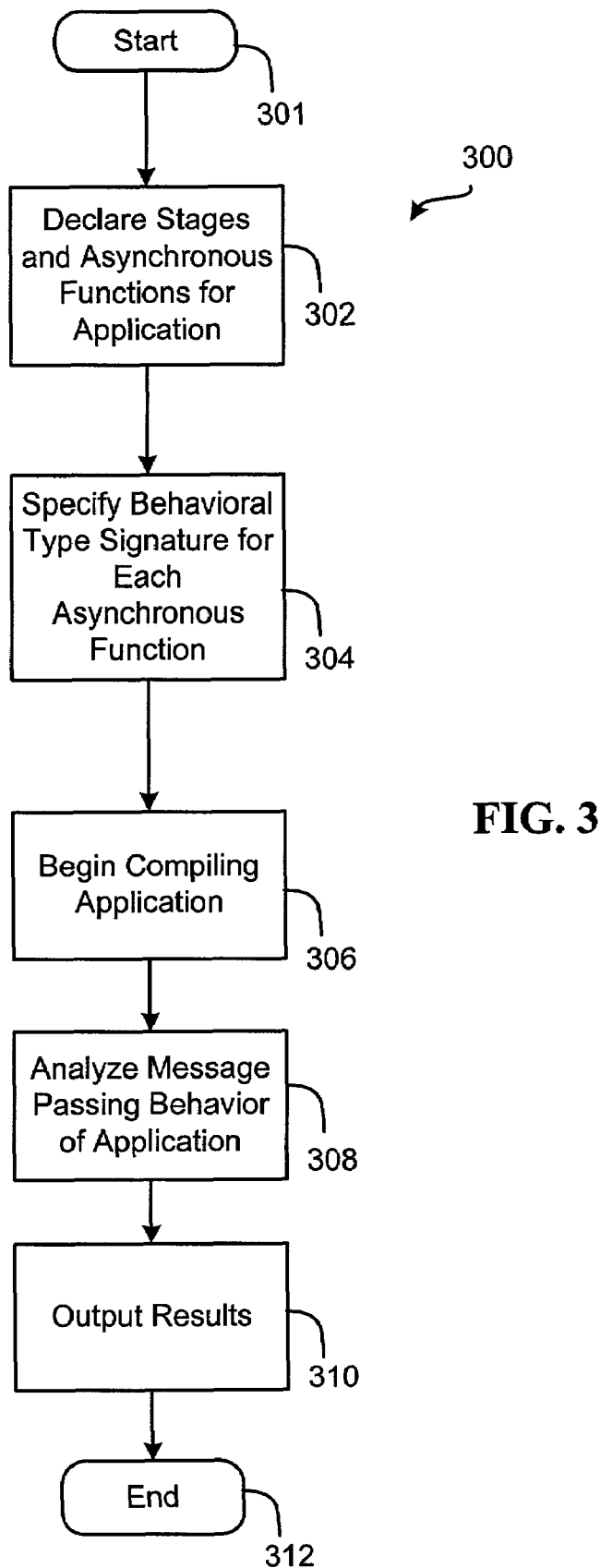
FIG. 3 is a flow diagram that illustrates operational characteristics for developing a message-passing application program in accordance with an embodiment of the present invention.

With the asynchronous computing environment 100 in mind, a flow diagram illustrating operational characteristics of a process 300 for developing (hereinafter, "development process") a message-passing application is shown in FIG. 3 in accordance with an embodiment of the present invention. The development process 300, which may be a combination of manual and computer-implemented operations, comprises an operation flow beginning with a start operation 301 and ending with a terminate operation 312. From the start operation 301, the operation flow passes to a declare operation 302.

The declare operation 302 declares stages and asynchronous functions, or operations, for the message-passing application. Stages, which are collections of asynchronous functions, form the concurrent building blocks for the message-passing application. Each stage in the message-passing application exports an interface of asynchronous functions through which other stages pass data and invoke computations. Asynchronous functions are functions that call other functions, wherein the called function executes upon being called. The function that does the calling is referred to herein as the "caller." The function that is called is referred to herein as the "callee." Both functions, the caller and the callee, may continue computing, and thus communicate with other functions, while communicating between each other. The caller and callee communicate with one another using explicit handles and a join construct. Since these functions may be executing substantially simultaneously, they are asynchronous. Stages have scheduling autonomy to control the order and concurrency with which the stages execute asynchronous functions contained therein. After the stages and asynchronous functions contained in the stages are declared for the message-passing operation, the operation flow passes to a specify protocol operation 304.

The specify protocol operation 304 specifies communication rules, or protocols, for passing messages between asynchronous functions. The protocols are specified by declarations referred to as behavioral type signatures. The behavioral type signatures dictate timing of input and output actions by the asynchronous functions in communicating with other asynchronous functions. The behavioral type signatures are defined such that messages may be passed between asynchronous functions with negligible or minimum deadlocking errors. More precisely, behavioral type signatures are intended to prevent certain logical design errors related to stuckness from occurring. Stuckness may be generally defined as one process getting stuck waiting for another process to send it a message that never gets sent, or one process getting stuck trying to send a message to another process that never attempts to receive it. Stuck-freeness may thus be defined as a property of asynchronous functions to not get stuck during communications. In an embodiment, the developer specifies a behavioral type signature for each asynchronous function of the message-passing application under development. From the specify protocol operation 304, the operation flow passes to an initiate compile operation 306.

The initiate compile operation 306 begins compiling the message-passing application and the operation flow passes to an analyze operation 308.

The analyze operation 308 evaluates behavioral properties of the message-passing application itself. As such, in accordance with an embodiment, the analyze operation 308 analyzes whether the message-passing application may be executed without any deadlock errors. In this analysis, the analyze operation 308 compares an implementation model of each asynchronous function in the message-passing application to an associated behavioral type signature for each function. By checking each asynchronous function of the message-passing application program in this manner, the analyze operation 308 may readily determine whether the message-passing application, as a whole, contains any deadlock errors, and if so, how many. From the analyze operation 308, the operation flow passes to an export operation 310. The export operation 310 submits the results of the analyze operation 308 to the developer of the message-passing application so that the developer may model the application, i.e. specify proper behavioral type signatures, or edit the source code such that deadlock errors are minimized. From the export operation 310, the operation flow concludes at the terminate operation 312.

Figure 4:
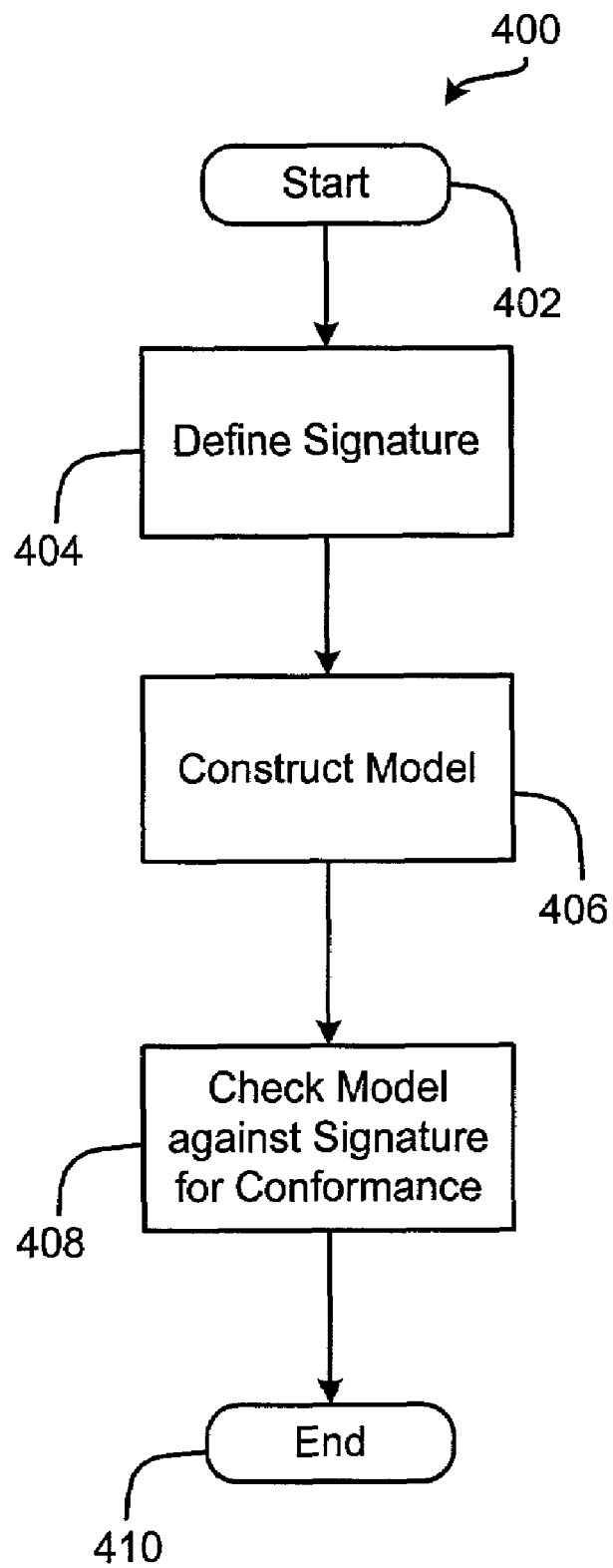
FIG. 4 is a flow diagram that illustrates operational characteristics for evaluating behavioral properties of a message-passing application program in accordance with an embodiment of the present invention.

Referring now to FIG. 4, a flow diagram illustrating operational characteristics of a process 400 for evaluating (hereinafter, "the evaluation process") behavioral properties of a message-passing application is shown in accordance with an embodiment of the present invention. The evaluation process is a sub-process of the development process 300 illustrated in FIG. 3, wherein the evaluation process 400 is initiated following the declare operation 302. Alternatively, the evaluation process 400 may be a stand-alone process that evaluates source code of a message-passing application program already developed. For illustrative purposes, the evaluation process 400 is described below as evaluating behavioral properties of a single asynchronous function, or operation, on a stage of the message-passing application. It should be appreciated that the evaluation process 400 may be implemented or performed multiple times, sequentially or simultaneously, to evaluate behavioral properties of multiple asynchronous functions on multiple stages of the message-passing application.

For illustrative purposes, the evaluation process 400 is described below as evaluating behavioral properties of an asynchronous function (operation client) that acts as both a caller and a callee to other asynchronous functions. More specifically, operation client in this illustration is called by, and thus takes the form of a callee to, an asynchronous function named operation main, and calls, thereby taking the form of a caller to, an asynchronous function named operation server, as shown in the exemplary code listing provided in Table 1, below.

TABLE 1

```
//Declaration of Server
operation server (inhandle:z, outhandle:w) @z?→w!
//Implementation of client
operation client (inhandle:x, outhandle: y)@x?→y!
{
select x?()→
    async c,d. server (c,d)
    in
        select d?()→y!
}
main(){
    async u,v. client(u,v)
```

TABLE 1-continued

```
in
    send u[];
    select y?()→null;
```

The evaluation process 400 comprises an operation flow beginning with a start operation 402 and concluding with a terminate operation 410. The operation flow is initiated at the start operation 402 during application program development as a programmer is making a declaration statement for an asynchronous function on a stage of the message-passing application program. From the start operation 402, the operation flow passes to a set behavioral type operation 404. The set behavior type operation 402, which may be a manual or computer-implemented process, or combination thereof, defines a communication protocol, hereinafter referred to as a behavioral type signature, that specifies the externally visible message-passing behavior of the asynchronous function. That is, the signature dictates timing of input and output actions by the asynchronous function for communicating with external callers. The external callers may be other asynchronous functions on separate stages of the message-passing application under development or other asynchronous functions on stages of message-passing applications resident in the distributed computing environment.

Whereas the asynchronous function is in the form of executable code, the behavioral type signature is a non-executable statement that is written by the programmer, such as in a language different from that of the code constituting the asynchronous function. A behavioral type signature is not used during execution of the asynchronous function, but rather it is used at compile-time to build a model of the function. The construction of such a model is described below with reference to a construct model operation 406. The constructed model is used, at compile time, to construct a model of the caller. The model can then be used for model checking (such as checking stuck-freeness of the caller). The behavioral type signature can in addition be used for documentation, as an interface specification. For example, a programmer who needs to call a function may derive guidance for the way the programmer should write his calling code by looking at the function's behavioral type signature.

Illustrating communications between two asynchronous functions, the asynchronous function that initiates the communications by sending an asynchronous call to another asynchronous function is referred to as the caller, wherein the asynchronous function receiving t the asynchronous call is referred to as the callee. The behavioral type signature for the caller thus specifies that the caller will first send a message, and then wait for a response prior to sending another message to the callee. In contrast, the behavioral type signature for the callee specifies that the callee is to wait for the initial message, and then respond to the caller by sending a message back to the caller. As an asynchronous call is made to an asynchronous function by another asynchronous function, handles are created as a side effect of the call. The handles serve as communication channels used for sending and receiving messages between the two asynchronous functions. Handles are unidirectional, and thus may only be used for either input or output by an asynchronous function. A behavioral type signature thus dictates the message-passing behavior of the asynchronous functions on its handles by making a promise as to what a particular asynchronous function can do on the specified handles.

With reference to the code listing of Table 1, operation client is an asynchronous function that follows the behavioral type signature "x?→y!," whereas operation server is an asynchronous function that follows the behavioral type signature "z?→w!." As shown with operations client and server, the behavioral type signatures are introduced in the function declaration after the "@" sign in accordance with an embodiment of the present invention. With respect to operation client, the signature states that this asynchronous function first waits for a message on a first handle (x), and then, once the message is received, promises that this asynchronous function will send the caller a message on a second handle (y). With respect to operation server, the signature states that this asynchronous function first waits for a message on a first handle (z), and then, once the message is received, promises that this asynchronous function will send the caller a message on a second handle (w). Indeed, operation server is known to operation client only through the interface with behavioral type @z?→w! and operation client is known to operation main only though the interface with behavioral type x?→y!. After the behavioral type signature is specified for the asynchronous function, the operation flow awaits completion of program development and then passes to a construct model operation 406 during program compilation procedures.

The construct model operation 406 extracts an implementation model of the asynchronous function that is a reflection of the behavioral, i.e., message-passing, actions performed by the asynchronous function during compile. The declaration of the asynchronous function specifies the handles as the externally visible communication channels through which the asynchronous function may communicate with other functions. In accordance with an embodiment, the construct model operation 406 constructs the implementation model based only on the actions that the asynchronous function takes on the handles defined in the asynchronous function declaration. More specifically, the implementation model (shown below as M) is constructed by the construct model operation 406 to be a subset of processes satisfying the following assumptions: (1) For every free channel x, x is either used exclusively for sending or exclusively for receiving; and (2) For every external choice of the form $(x_1?\rightarrow M_1 + x_2?\rightarrow M_2 + \ldots + x_k?\rightarrow M_k)$, either all the $x_i$ are free channels or all the $x_i$ are bound channels.

$$M = x? \rightarrow (new\ c,d)((d? \rightarrow y!) \| (c? \rightarrow d!))$$

With reference to the code listing provided in Table 1, the implementation model (M) constructed for operation client captures the fact that operation client initially waits for input on handle x and then continues to create new handles c and d, as a side-effect of the asynchronous call to operation server. In accordance with the second assumption noted above, the implementation model reflects the behavior of operation client as the operation first waits for a message on handle d, and once received, the sends a response on handle y. This process is written as d?→y! and directly reflects the behavior of operation client after the call. Likewise, the implementation model reflects the behavior of operation server as the operation first waits for a message on handle c, and once received, sends a response on handle d. This process, which is written as c?→d!, is performed parallel to the process of operation client noted above and represents the effect of the call to operation server. The effect arises from the behavioral type of operation server by instantiating the operation with handle names passed to operation server in the asynchronous call. From the construct model operation 406, the operation flow passed to a check conformity operation 408.

The check conformity operation 408 checks whether the implementation model for the asynchronous function conforms to the behavioral type signature specified for the function. That is, the check conformity operation 408 compares the actions of the implementation model to actions specified in the behavioral type signature to determine if any message-passing related errors are contained in the executable code of the asynchronous function. As described in more detail with FIG. 8, conformance requires a number of conditions to apply. If all the conditions are met, then conformance holds. If any one of those conditions is not met, then conformance does not hold. In accordance with an embodiment, one condition may be that the implementation model is required to perform at least one action specified by the behavioral type signature. For instance, the behavioral type signature may specify any number of actions; however, the implementation model is said to conform to the behavioral type signature so long as the implementation model shows the function performing at least one of the actions at run-time.

As the case with the asynchronous functions of the exemplary code listing shown in Table 1, a call to an asynchronous function on another stage (either for the same message-passing application or for a separate message-passing application) is contained in the executable code for the asynchronous function being evaluated. When checking the implementation model for conformance with a signature, the check conformity operation 408 makes the assumption that the callee conforms to its associated behavioral type signature, and thus will not deadlock, thereby starting a chain reaction of deadlocking other asynchronous functions, including the asynchronous function being evaluated. Thus, with reference to operation client in the exemplary code listing of Table 1, the check conformity operation 408 only evaluates whether the implementation model conforms to its signature (x?→y!). Because executable code contained in operation client calls operation server, the check conformity operation 408 assumes that the operation server conforms to its signature (z?→w!), and therefore will not deadlock. In accordance with an embodiment, the check conformity operation 408 may only be concerned with actions visibly external to the asynchronous function being evaluated, rather than actions internal to the executable code.

If the check conformity operation 408 determines that the implementation model conforms to the behavioral type signature, the asynchronous function is marked as such. Where conformity exists, the asynchronous function is considered to satisfy principles of stuck-freeness. As noted above with FIG. 3, stuck-freeness may be defined as a property of asynchronous functions to not get stuck during communications in accordance with an embodiment of the present invention. The model of the caller to the asynchronous function is stuck-free because conformance of the behavioral type signature and the implementation model ensures that behavioral type signature contains all of the behavior of implementation model. As such, certain kinds of deadlock cannot occur. In contrast, if the check conformity operation 408 determines that the implementation model and the behavioral type signature do not conform, deadlock is not guaranteed to occur. Thus, if the conformance test fails, then there is a possible deadlock as the asynchronous function communicates with other asynchronous functions. A checking tool can present the programmer with information about what situation could bring about the deadlock. However, due to the nature of the models and the checking tool, it is possible that this situation could not arise during actual execution of the program. That is, if the check conformity operation 408 finds that the implementation model and the behavioral type signature do not conform, then a checking tool may be used to detect certain deadlock situations that could occur, but that might not under actual execution conditions. From the check conformity operation 408, the operation flow passing to the terminate operation 410.

Figure 5:
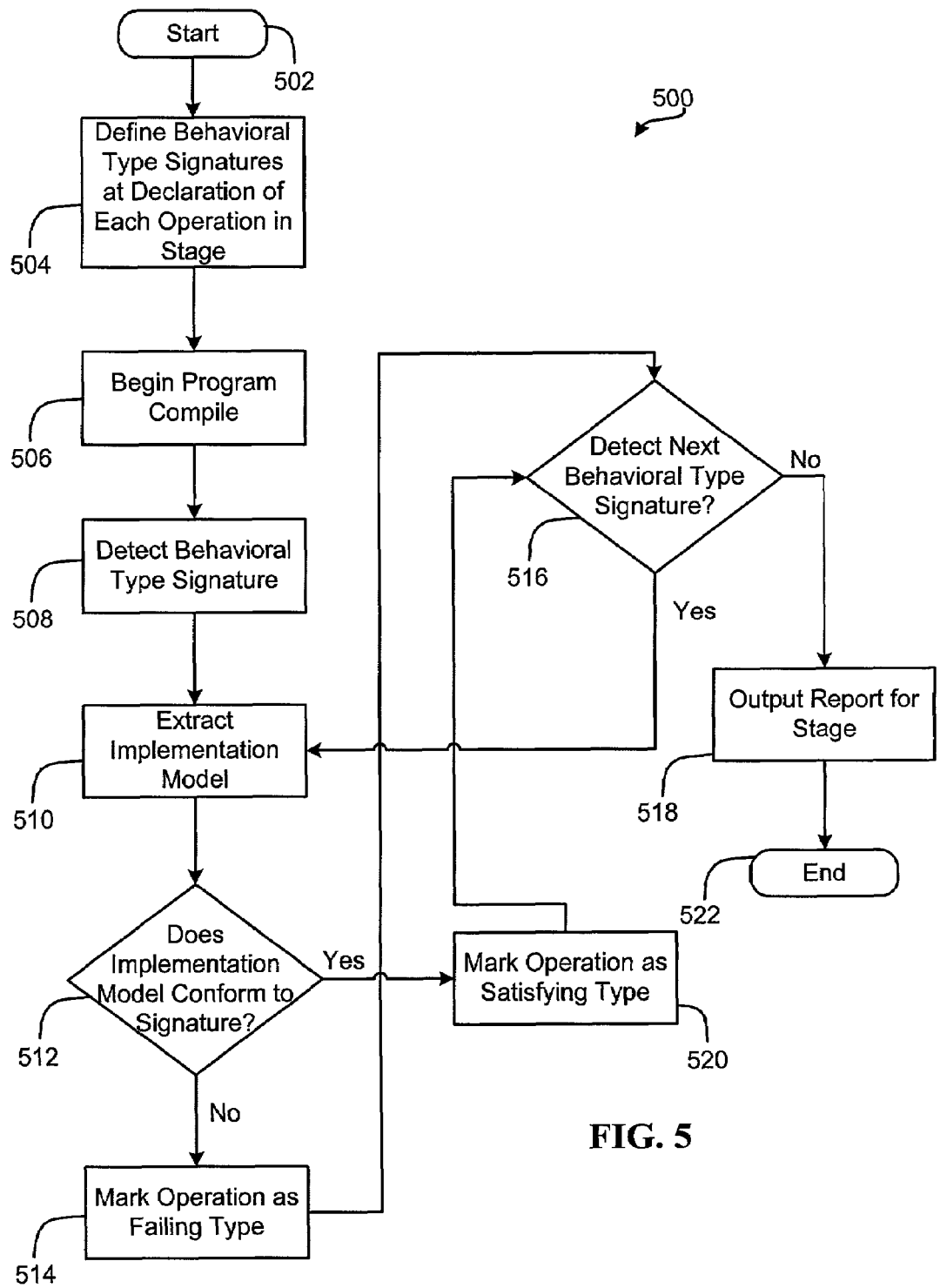
FIG. 5 is a flow diagram that illustrates operational characteristics shown in FIG. 4 in more detail in accordance with an embodiment of the present invention.

FIG. 5 is a process 500 for evaluating behavioral properties of a message-passing application more particularly illustrating operations shown in the evaluation process 400 in accordance with an embodiment of the present invention. The evaluation process 500 shown in FIG. 5 individually evaluates behavioral properties of each asynchronous function on a stage of the program to render a report on the behavioral properties of the program as a whole. Although the evaluation process 500 is described below as evaluating behavioral properties of asynchronous functions on a single stage of the message-passing application, it should be appreciated that the evaluation process 500 may be implemented or performed multiple times, sequentially or simultaneously, to evaluate behavioral properties of asynchronous functions on multiple stages of the message-passing application.

The evaluation process 500 includes an operation flow beginning with a start operation 502 and ending with a terminate operation 522. As with the evaluation process 400 illustrated in FIG. 4, the start operation 502, and thus the operation flow, is initiated during program development as a programmer is making a declaration statement for the asynchronous functions on a stage being evaluated. From the start operation 502, the operation flow passes to a define protocol operation 504.

The define protocol operation 504, which may be a manual or computer-implemented process, or a combination thereof, specifies a behavioral type signature for each asynchronous function on the stage in a manner as described above with reference to the set behavioral type operation 404 of FIG. 4. Operations for defining a behavioral type signature for an asynchronous function are also described in more detail with reference to FIG. 6. From the define protocol operation 504, the operation flow passes to an initiate compile operation 506. The initiate compile operation 506 begins compiling the message-passing application. From the initiate compile operation 506, the operation flow passes to a detect operation 508. The detect operation 508 traverses the code listing of the stage to detect the first asynchronous function being invoked on the stage that has a behavioral type signature appended thereto. As described with reference to the set behavioral type operation 404 of FIG. 4, the behavioral type signature may be appended to the end of the declaration for each asynchronous function in accordance with an embodiment of the present invention. As shown in the code listing of Table 1, the behavioral type signature follows the "@" sign placed in the declaration of each asynchronous function on the stage. After this asynchronous function is detected, the operation flow passes to an extract model operation 510.

The extract model operation 510 extracts an implementation model for the asynchronous function having the behavioral type signature detected by the detect operation 508. The implementation model is a reflection of the behavioral, i.e., message-passing, actions performed by the asynchronous function during compile. More particularly, the implementation model is a message-passing control skeleton in the form of an abstraction depicting the message-passing behavior of the asynchronous function. The implementation model is extracted in a manner as described above with reference to the construct model operation 406, and more particularly, with reference to the specific example illustrated below in FIG. 7. From the extract model operation 510, the operation flow passes to a first query operation 512.

The first query operation 512 determines whether the implementation model extracted by the extract operation 512 conforms to its associated behavioral type signature. That is, the first query operation 512 determines whether any message-passing related errors are contained in the executable code of the asynchronous function by comparing the actions of the implementation model to actions specified in the behavioral type signature. Such analysis is described above with reference to the check conformity operation 408, and more particularly, with reference to the specific example illustrated below in FIG. 8. If the first query operation 512 determines that the implementation model conforms to the behavioral type signature, the operation flow passes to a mark satisfy operation 520. The mark satisfy operation 520 marks the asynchronous function as having satisfied the conformance check, and thus guaranteed against deadlock. In contrast, if the first query operation 512 determines that the implementation model does not conform to the behavioral type signature, the operation flow passes to mark fail operation 514, which marks the asynchronous function associated with the implementation model as having failed the conformance check, and thus containing an error with respect to message-passing properties. Such an error may cause deadlock as the message-passing application is executed and the asynchronous function communicates with other asynchronous functions. From the mark fail operation 514 and the mark satisfy operation 520, the operation flow passes to a second query operation 516.

The second query operation 516 starts at the asynchronous function just evaluated and continues traversing the code listing of the stage to detect the next asynchronous function being invoked on the stage that has a behavioral type signature appended thereto. If the second query operation detects a subsequent behavioral type signature, the operation flow passes to the extract model operation 510 and thereafter continues as previously described. If, however, the second query operation 510 does not detect a subsequent behavioral type signature, the operation flow passes to an output report operation 518. The output report operation 518 generates a report indicative of whether the stage, as a whole, contains any behavioral type errors based on individual evaluations of each asynchronous function against its associated behavioral type signature. Once created, the output report operation 518 outputs the report to the programmer of the message-passing application. In accordance with an embodiment, the report may include a listing of each of the asynchronous functions on the stage and associate each function with the mark rendered by either the mark fail operation 518 or the mark satisfy operation 520, thereby enabling the programmer to visualize exactly which function declarations or behavioral type signatures need to be revised. After the report is generated and output to the programmer by the output report operation 518, the operation flow concludes with the terminate operation.

Figure 6:
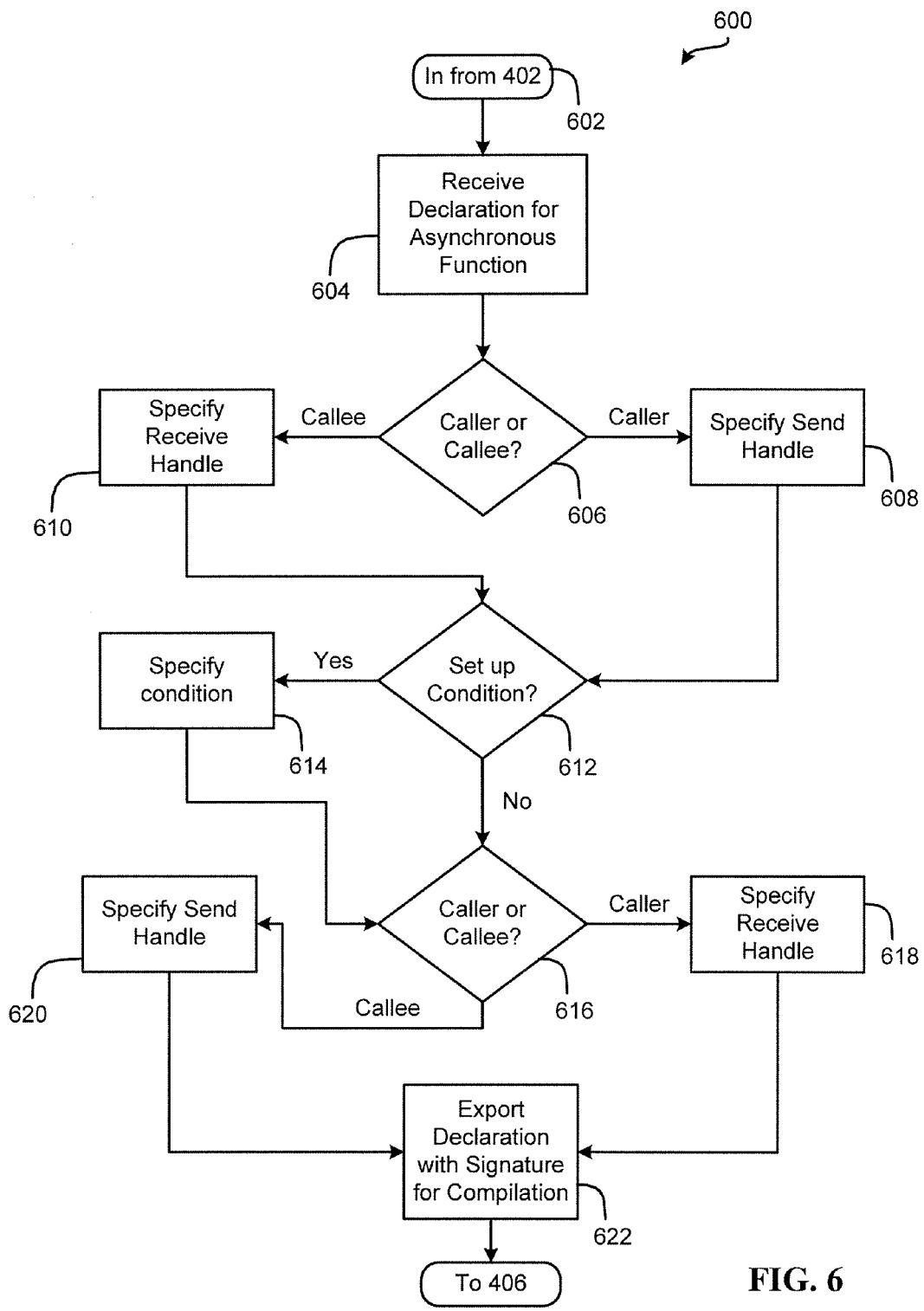
FIG. 6 is a flow diagram that illustrates operational characteristics for defining a behavioral type signature for an asynchronous function in the message-passing application program of FIG. 4.

Referring now to FIG. 6, a process 600 for defining (hereinafter, "the define process") a behavioral type signature for an asynchronous function in a message-passing application is shown in accordance with an embodiment of the present invention. Therefore, with reference to FIGS. 4 and 5, the embodiment shown in the process 600 is a more detailed illustration of the operational characteristics of the set behavioral type operation 404 and the define protocol operation 504, respectively. Because the evaluation process 500 of FIG. 5 is a more detailed illustration of the evaluation process 400 shown in FIG. 4, the define process 600 is described below as beginning and ending within the operation flow of the evaluation process 400 shown in FIG. 4. It should be appreciated, however, that the define process 600 may be implemented within the evaluation process illustrated in FIG. 5. As noted above, the set behavioral type process 404, and thus the define process 600, define a protocol, hereinafter referred to as a behavioral type signature, that specifies the externally visible message-passing behavior of an asynchronous function. The behavioral type signature dictates timing of input and output actions by the asynchronous function for communicating with external callers. Furthermore, the define process 600, like the set behavioral type process 404 may be either a manual or computer-implemented process, or a combination of both.

The define process 600 comprises an operation flow that begins at an import operation 602. The import operation 602 receives a declaration for executable code of an asynchronous function in the message-passing application. The import operation 602 is therefore initiated as operation flow for the evaluation process 400 leaves the start operation 402 and enters the set behavioral type operation 404. After the declaration is received by the receive operation 604, the operation flow passes to a first query operation 606. The first query operation 606 determines whether the asynchronous function is to be specified as a caller or callee. If the asynchronous function is to send an asynchronous call to another asynchronous function, then the function is to initially operate as a caller. Otherwise, the asynchronous function is to initially operate as a callee. If the first query operation 606 determines that the asynchronous function is to be specified as a caller, the operation flow passes to caller specify operation 608. The caller specify operation 608 specifies the first action for the function to be an output on a particular handle. The following declaration for operation test provides an exemplary behavioral type signature wherein the first action of the signature is an output action on handle y:

operation test (inhandle:x, outhandle: y)@y!→x?

If, however, the first query operation 606 determines that the asynchronous function is to be specified as a callee, the operation flow passes to callee specify operation 610. The callee specify operation 610 specifies the first action for the function to be an input on a particular handle. The following declaration for operation test provides an exemplary behavioral type signature wherein the first action of the signature is an input action on handle x:

operation test (inhandle:x, outhandle: y)@x?→y!

From the specify operations (608, 610), the operation flow passes to a second query operation 612. The second query operation 612 determines whether a condition should be placed in the behavioral type signature. A condition in this respect is an act, or set of acts, that must occur prior to an asynchronous function associated with the condition taking a message-passing action specified in the behavioral type signature. A condition affects whether the first action is actually taken, postponed until satisfaction of a condition, or alternatively whether the asynchronous function should await satisfaction of a condition prior to continuing to a second action, assuming the first action is indeed taken. Whether a condition should occur as the asynchronous function is communicating with another asynchronous function is a matter of choice for the programmer, and thus is not described in greater detail herein.

If the second query operation 612 determines that a condition is to be placed in the behavioral type signature, the operation flow passes to a specify condition operation 614. The specify condition operation 614 specifies the condition that is to occur as the asynchronous function is communicating with another asynchronous function. From the specify condition operation 614, the operation flow passes to a third query operation 616. It should be appreciated that a behavioral type signature may specify any number of conditions for communications on handles for the asynchronous function following the signature. For clarity, however, the define process 600 is described as the behavioral type signature specifies either one or no conditions. Nevertheless, should the programmer decide to specify multiple conditions in the behavioral type signature, the second query operation 612 and the specify condition operation 614 may be continuously repeated until all desired conditions are included in the signature.

The third query operation 616 determines whether the final action for the asynchronous Function is an output or input action. In order to ensure that the asynchronous function does not deadlock, such a determination may be made based on whether the asynchronous function is specified as a caller or a callee, as determined by the first query operation 606. If the asynchronous function is a caller, the operation flow passes to a specify receive operation 618. The specify receive operation 618 specifies the final action for the asynchronous function to be an input on a separate handle than the handle to be used by the send action. Referring back to the exemplary declaration "operation test (inhandle:x, outhandle: y)@y!→x?," shown therein is the behavior of operation test as the asynchronous function awaits an input on handle x after the operation has already sent an output on handle y. In contrast, if the asynchronous function on is a callee, the operation flow passes to a specify send operation 620. The specify send operation 620 specifies the final action for the asynchronous function to be an output on a separate handle than the one to be used by the receive action. Referring back to the exemplary declaration "operation test (inhandle:x, outhandle: y)@x?→y!," shown therein is the behavior of operation test as the operation sends an output on handle y after the operation has already received an input on handle x. From the specify operations (618,620), the operation flow passes to an export operation 622. The export operation 622 exports the declaration for the asynchronous function containing the behavioral type signature such that the message-passing application may be compiled. From the export operation 622, the operation flow of the evaluation process 400 continues at the construct model operation 406.

Figure 7:
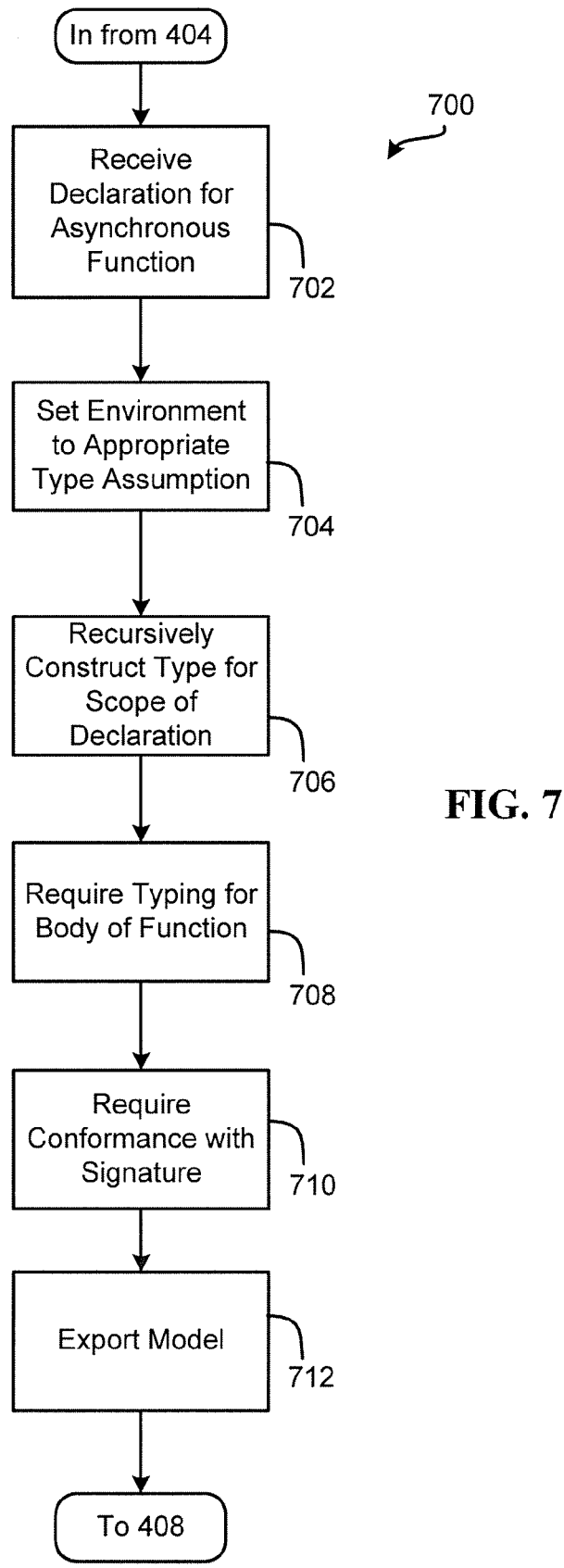
FIG. 7 is a flow diagram that illustrates operational characteristics for extracting an implementation model for an asynchronous function in the message-passing application program of FIG. 4.

Referring now to FIG. 7, a process 700 for extracting (hereinafter, "the extraction process") an implementation model from an asynchronous function in a message-passing application program under development is shown in accordance with an embodiment of the present invention. Therefore, with reference to FIGS. 4 and 5, the embodiment shown in the extraction process 700 is a more detailed illustration of the operational characteristics of the construct model operation 406 and the extract model operation 510, respectively. Because the evaluation process 500 of FIG. 5 is a more detailed illustration of the evaluation process 400 shown in FIG. 4, the extraction process 700 is described below as beginning and ending within the operation flow of the evaluation process 400 shown in FIG. 4. It should be appreciated, however, that the extraction process 700 may be implemented within the evaluation process 500 illustrated in FIG. 5. As noted above, the implementation model extracted by the extraction process 700 is a reflection of the behavioral, i.e., message-passing, actions performed by the asynchronous function during compilation of the message-passing application program.

The extraction process 700 comprises an operation flow that begins at an import operation 702. The import operation 702 receives a declaration for executable code for the asynchronous function in the message-passing application. The declaration includes a behavioral type signature appended thereto that specifies the externally visible message-passing behavior of the asynchronous function. The import operation 702 is therefore initiated as the operation flow for the evaluation process 400 leaves the set behavioral type operation 404 and enters the construct model operation 406. After the declaration is received by the import operation 702, the operation flow passes to a set of processing operations that apply a series of typing rules to the asynchronous function from which the implementation model is being extracted. For illustrative purposes, the extraction process 700 is described below using an exemplary asynchronous function ($f$) that accepts specified handle parameters $\vec{h}$. When called, the function $f$ behaves according to the behavioral type signature (T) specified with the declaration of function $f$. As such, the message-passing behavior of function $f$ on the specified handles $\vec{h}$ is abstracted by the behavioral type signature (T). The specified handles $\vec{h}$ accepted by the function $f$ are used according to the usage-mode qualifiers $\vec{m}$, wherein each qualifier $m_i$ is either in or out, thereby indicating whether the handle $h_i$ associated with the qualifier $m_i$ can be used for input (in) or output (out) within the body of the function $f$. The exemplary function $f$ is shown by the declaration below:

$$\operatorname{operation} f(\vec{h}:\vec{m},\vec{x})@T=P \text{ in } D$$

The first processing operation 702 applies a typing rule to the function $f$ that sets the environment for the function to contain the appropriate type assumption, as follows:

$$f:\operatorname{op}(h:\vec{m},x)@T$$

The fact that this assumption is required to be in an environment E prior to checking the declaration allows the type system to handle mutually recursive definitions. From the first application operation 704, the operation flow passes to a second processing operation 706. The second processing operation 706 applies a typing rule to the function $f$ that requires a recursively constructed typing for the scope of the declaration. From the second processing operation 706, the operation flow passes to a third processing operation 708. The third processing operation 708 applies a typing rule to the function $f$ that requires a typing of the body of the function $f$, using assumptions about the handle parameters consistent with the declaration of the handle parameters. From the third processing operation 708, the operation flow passes to fourth processing operation 710. The fourth processing operation 710 applies a typing rule to the function $f$ that requires conformance of the implemenation model to the behavioral type (T) specified for the function $f$ Finally, after each of the typing rules have been applied to the function $f$, a valid implementation model for the declaration of the function $f$ is realized and the operation flow concludes with an export operation 712. The implementation model for the exemplary function $f$, which is declared by the statement (new $f$)(*($f$?→0)||M), captures the fact that the declaration for the function $f$ introduces the function $f$ as a new name in the scope of the function $f$. The implementation model also captures the fact that the function $f$ acts as a server running concurrently with the specified scope (modeled by M), which perpetually monitors the handle $f$. The effect T (representing, via I, the body of $f$) of calling $f$ is not present in the implementation model for the function $f$ but instead is captured in the type assumption for the function $f$ and is used to construct models at the call-sites to the function $f$. The export operation 712 exports the implementation model to the check conformity operation 408 of the evaluation process 400 and continues as previously described.

Figure 8:
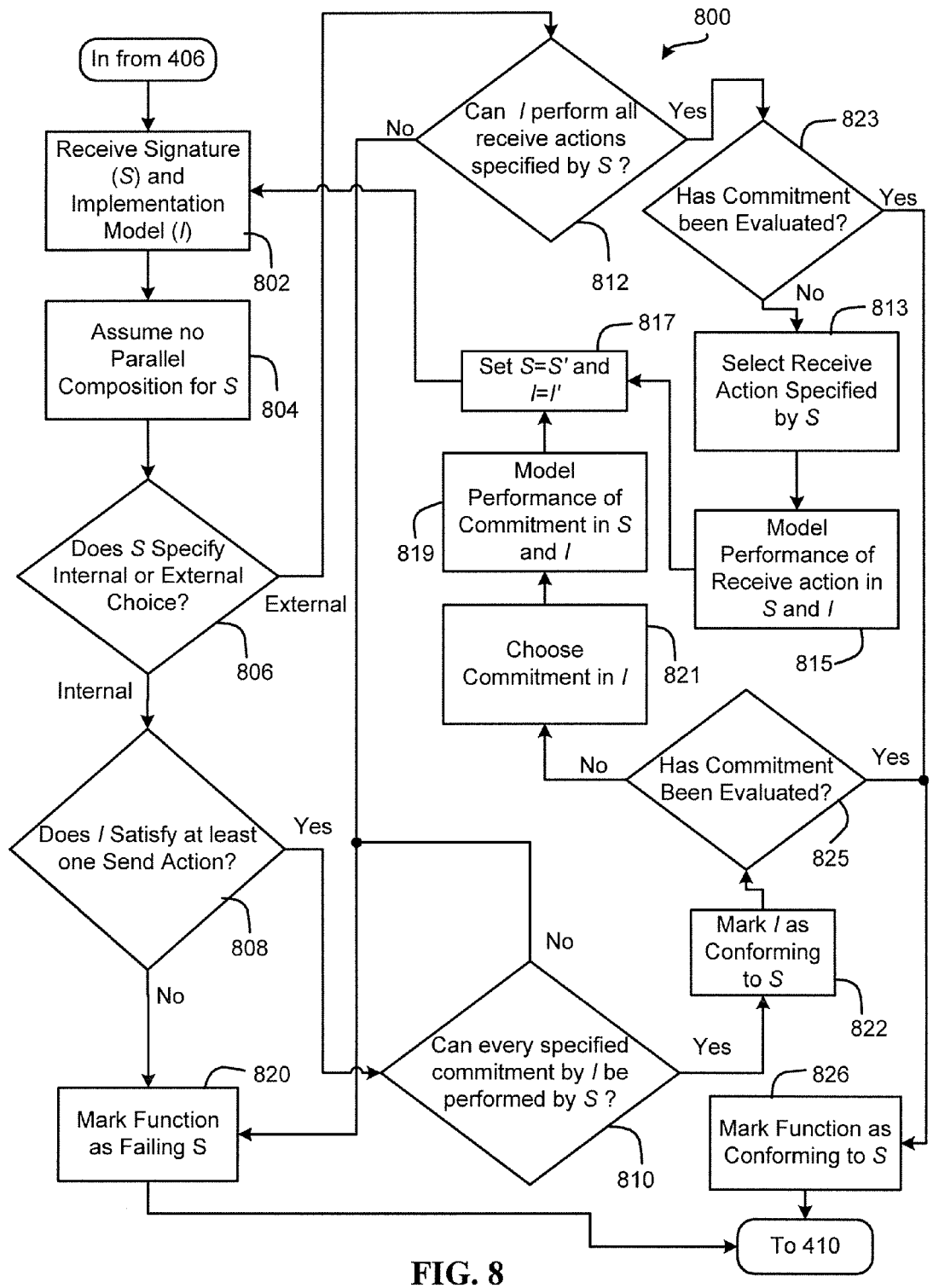
FIG. 8 is a flow diagram that illustrates operational characteristics for checking the implementation model extracted in FIG. 7 for conformance with an associated behavioral type signature.

Referring now to FIG. 8, a process 800 for checking an implementation model extracted from an asynchronous function of a message-passing application for conformance with an associated behavioral type signature is shown in accordance with an embodiment of the present invention. Conformance is defined as a binary relation (written "≦") between the implementation model and the behavioral type signature. With reference to FIGS. 4 and 5, the embodiment shown in the process 800 is a more detailed illustration of the operational characteristics of the check conformity operation 408 and the first query operation 512, respectively. Because the evaluation process 500 of FIG. 5 is a more detailed illustration of the evaluation process 400 shown in FIG. 4, the conformance checking process 800 is described below as beginning and ending within the operation flow of the evaluation process 400 shown in FIG. 4. It should be appreciated, however, that the conformance checking process 800 may be implemented within the evaluation process 500 illustrated in FIG. 5.

The conformance checking process 800 comprises an operation flow that begins at an import operation 802. The import operation 802 receives the behavioral type signature specifying behavioral actions for the asynchronous function as well as the implementation model for executable code of the asynchronous function. The import operation 802 is therefore initiated as operation flow for the evaluation process 400 leaves the construct model operation 406 and enters the check conformity operation 408. After the implementation model is received by the import operation 802, the operation flow passes to an assume operation 804. The assume operation 804 makes the assumption that the behavioral type signature does not have parallel composition. Parallel composition refers to situations wherein the asynchronous function contains more than one behavioral type signature specifying separate processes of the function that operate substantially simultaneously, i.e. in parallel with one another. From the assume operation 804, the operation flow passes to a first query operation 806. The first query operation 806 determines whether the implementation model is an internal choice of send operations or an external choice of receive operations for the asynchronous function. An external choice is a receive operation on a specified set of channels such that message-input happens on the first of the specified channels to receive a message. Thus, the sender determines on which of the specified channels input happens. The external choice operation blocks until at least one message has arrived on at least one of the specified channels. An internal choice is a send operation on a specified set of channels such that message-output happens on at least one of the specified channels. Which of the specified channels is chosen for message-output is non-deterministic (that is, it could be any one of them).

If the first query operation 806 determines that the implementation model is an internal choice of send operations for the asynchronous function, the operation flow passes to a second query operation 808. The second query operation 808 checks whether the implementation model can perform at least one of the send operations specified by the behavioral type signature. If the implementation model cannot perform at least one of the specified send operations, then the implementation model does not conform to the behavioral type signature and the operation flow passes to a first mark fail operation 820. The mark fail operation 820 marks the asynchronous function as failing to conform to the behavioral type signature. From the mark fail operation 820, the operation flow concludes at the terminate operation 410. In contrast, if the implementation model can perform at least one of the specified send operations, then the operation flow passes to a third query operation 810.

The third query operation 810 checks whether every commitment, i.e., rule specifying either a send or a receive action, of the implementation model on a free handle can be performed by the behavioral type signature. If the third query operation 810 determines that each commitment of the implementation model on a free handle can indeed be performed by the behavioral type signature, then operation flow passes to a first mark conform operation 822. The first mark conform operation 822 marks the implementation model as conforming to the behavioral type signature. In contrast, if the third query operation 810 determines that each commitment of the implementation model on a free handle cannot be performed by the behavioral type signature, the operation flow passes to the first mark fail operation 820 and continues as described above.

From the first mark conform operation 822, the operation flow passes to the fifth query operation 825. The fifth query operation 825 determines whether the performance of at least one commitment of the implementation model has been evaluated by the conformance checking process 800. If the performance of at least one commitment has been evaluated, the operation flow passes to a second mark conform operation 826. The second mark conform operation 826 marks the asynchronous function as conforming to the behavioral type signature. From the second mark conform operation 826, the operation flow concludes at the terminate operation 410 of the evaluation process 400.

In contrast, if the fifty query operation 825 determines that performance of at least one commitment of the implementation model has not been evaluated, the operation flow passes to a select commitment operation 821. The select commitment operation 821 selects a commitment of the implementation model. The operation flow then passes to a first model operation 819. The first model operation 819 models the performance of the selected commitment by the implementation model as well as the performance of the selected commitment by the behavioral type signature. More specifically, the first model operation 819 determines the result of the implementation model performing the selected commitment. For purposes of the operation flow, this result is referred to as a performance commitment for the implementation model (I'). The first model operation 819 also determines the result of the behavioral type signature performing the selected commitment. For purposes of the operation flow, this result is referred to as a performance commitment for the signature model (S').

From the first model operation 819, the operation flow passes to a define parameters operation 817. The define parameters operation 817 re-initiates the conformance checking process 800 with the performance commitments modeled by the first model operation 819 being used as the behavioral type signature (S) and the implementation model (I). Operation flow thus passes as previously described. In accordance with an embodiment, the set parameters operation 817 is used only one time to re-initiate the conformance checking process 800. However, the number of times that the conformance checking process 800 is performed may be modified using the fifth query operation 825, which as described above, branches "yes" to the second mark conform operation 826 if the performance of at least one commitment of the implementation model has been evaluated.

Referring back to the first query operation 806, if the implementation model is an external choice of receive operations, the operation flow passes to a fourth query operation 812. The fourth query operation 812 checks whether the implementation model can perform all of the receive operations specified by the behavioral type signature. If the implementation model cannot perform all of the specified receive operations, then the implementation model does not conform to the behavioral type signature and the operation flow passes to the first mark fail operation 820. As noted above, the first mark fail operation 820 marks the asynchronous function as failing to conform to the behavioral type signature and the operation flow thereafter concludes at the terminate operation 410. In contrast, if the implementation model can perform all of the specified receive operations, the operation flow passes to a fourth query operation 823.

The fourth query operation 823 determines whether the performance of at least one receive action specified by the behavioral type signature has been evaluated by the conformance checking process 800. If the performance of at least one receive action specified by the behavioral type signature has been evaluated, the operation flow passes to a second mark conform operation 826. The second mark conform operation 826 marks the asynchronous function as conforming to the behavioral type signature. From the second mark conform operation 826, the operation flow concludes at the terminate operation 410 of the evaluation process 400.

In contrast, if the fourth query operation 823 determines that performance of at least one receive action specified by the behavioral type signature has not been evaluated, the operation flow passes to a select action operation 813. The select action operation 813 selects a receive action specified by the behavioral type signature. The operation flow then passes to a second model operation 815. The second model operation 815 models the performance of the selected receive action by the behavioral type signature as well as the performance of the selected receive action by the implementation model. More specifically, the second model operation 815 determines the result of the implementation model performing the selected receive action. For purposes of the operation flow, this result is referred to as a performance action for the implementation model (I'). The second model operation 815 also determines the result of the behavioral type signature performing the selected receive action. For purposes of the operation flow, this result is referred to as a performance action for the signature model (S').

From the second model operation 815, the operation flow passes to a define parameters operation 817. The define parameters operation 817 re-initiates the conformance checking process 800 with the performance actions modeled by the second model operation 815 being used as the behavioral type signature (S) and the implementation model (I). Operation flow thus passes as previously described. In accordance with an embodiment, the set parameters operation 817 is used only one time to re-initiate the conformance checking process 800. However, the number of times that the conformance checking process 800 is performed may be modified using the fourth query operation 823, which as described above, branches "yes" to the second mark conform operation 826 if the performance of at least one commitment of the implementation model has been evaluated.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

The invention claimed is:

1. A method for developing a message-passing application program having a first program module with a plurality of asynchronous functions that communicate with operations of a second program module, the method comprising:

defining a behavioral type signature for one of the plurality of asynchronous functions, the behavioral type signature specifying message-passing properties for the one of the plurality of asynchronous functions, and the behavioral type signature dictating timing of input and output actions by the one of the plurality of asynchronous functions, and wherein the defining a behavioral type signature comprises determining whether a condition is to be placed in the behavioral type signature;

analyzing the one of the plurality of asynchronous functions against the behavioral type signature to render an evaluation on whether message-passing actions of the one of the plurality of asynchronous functions during execution of the message-passing application program will conform to the message-passing properties specified by the behavioral type signature, wherein the analyzing comprises:

extracting an implementation model of the one of the plurality of asynchronous functions, wherein the implementation model reflects the message-passing actions of the one of the plurality of asynchronous functions during compilation of the message-passing application program; and checking the implementation model against the behavioral type signature by comparing actions of the implementation model to actions specified in the behavioral type signature to determine whether message-passing related errors are contained in executable code of the one of the plurality of asynchronous functions, wherein the checking comprises: receiving the behavioral type signature specifying the message-passing properties for the one of the plurality of asynchronous functions, receiving the extracted implementation model, and assuming the behavioral type signature does not have parallel composition;

generating a report indicating whether any message-passing related errors exist, wherein the report includes the evaluation for the one of the plurality of asynchronous functions; and storing the evaluation in memory.

2. The method as defined in claim 1, further comprising:

marking the one of the plurality of asynchronous functions as conforming to the behavioral type signature if the message-passing actions of the one of the plurality of asynchronous conform to the message-passing properties specified by the behavioral type signature; and marking the one of the plurality of asynchronous functions as failing to conform to the behavioral type signature if the message-passing actions of the one of the plurality of asynchronous functions do not conform to the message-passing properties specified by the behavioral type signature.

3. The method as defined in claim 2, further comprising:

repeating the defining operation, the analyzing operation and one of the marking operations for each of the plurality of asynchronous functions on the first program module.

4. The method as defined in claim 1, wherein the report includes an indication as to whether the one of the plurality of asynchronous functions is marked as conforming to or failing to conform to the associated behavioral type signature.

5. The method as defined in claim 4, further comprising:
providing the report to a program developer developing the message-passing application program such that the program developer may complete development of the message-passing application program while taking into account the evaluation.

6. The method as defined in claim 1, wherein the checking operation comprises:
determining whether the behavioral type signature specifies an internal choice for performing an action or an external choice for performing an action.

7. The method as defined in claim 6, wherein the checking operation further comprises:
determining whether the implementation model performs at least one output action specified by the behavioral type signature if it is determined that the behavioral type signature specifies an internal choice; and
marking the evaluation to reflect that the one of the plurality of asynchronous functions fails to conform to the behavioral type signature if it is determined that the implementation model does not perform at least one output action specified by the behavioral type signature.

8. The method as defined in claim 7, wherein the checking operation further comprises:
determining whether all actions of the implementation model are actions allowed by the behavioral type signature; and
marking the evaluation to reflect that the one of the plurality of asynchronous functions conforms to the behavioral type signature if it is determined that the implementation model performs at least one output action specified by the behavioral type signature and that all actions of the implementation model are allowed by the behavioral type signature.

9. The method as defined in claim 6, wherein the checking operation further comprises:
determining whether the implementation model performs all input actions specified by the behavioral type signature if it is determined that the behavioral type signature specifies an external choice; and
marking the evaluation to reflect that the one of the plurality of asynchronous functions fails to conform to the behavioral type signature if it is determined that the implementation model does not perform all input actions specified by the behavioral type signature.

10. The method as defined in claim 9, wherein the checking operation further comprises:
determining whether all actions of the implementation model are actions allowed by the behavioral type signature; and
marking the evaluation to reflect that the one of the plurality of asynchronous functions conforms to the behavioral type signature if it is determined that the implementation model performs all input actions specified by the behavioral type signature and that all actions of the implementation model are allowed by the behavioral type signature.

11. The method as defined in claim 1, wherein the analyzing operation is performed as the message-passing application program is being compiled.

12. The method as defined in claim 1, wherein each of the plurality of asynchronous functions is written as executable source code in a first programming language and the behavioral type signature is written in a second programming language.

13. The method as defined in claim 1, wherein the message-passing application program operates in a local computing environment as an event-driven application program wherein messages are passed between the first program module and the second program module within the local computing environment.

14. The method as defined in claim 13, wherein the first program module is a first stage of the message-passing application program containing a first collection of two or more of the plurality of asynchronous functions and the second program module is a second stage of the message-passing application program containing a second collection of two or more of the plurality of asynchronous functions.

15. The method as defined in claim 1, wherein the message-passing application program operates in .a distributed computing environment.

16. The method as defined in claim 15, wherein the first program module is a stage of the message-passing application program containing a collection of two or more of the plurality of asynchronous functions and the second program module is a stage of a second message-passing application program within the distributed computing environment.

17. A computer storage medium readable by a computing system and encoding a computer program of instructions for executing a computer process for controlling operations of the computing system and for developing a message-passing application program having a first program module with a plurality of asynchronous functions that communicate with operations of a second program module, the computer process comprising:
defining a behavioral type signature for one of the plurality of asynchronous functions, the behavioral type signature specifying message-passing properties for the one of the plurality of asynchronous functions, and the behavioral type signature dictating timing of input and output actions by the one of the plurality of asynchronous functions, and wherein the defining a behavioral type signature comprises determining whether a condition is to be placed in the behavioral type signature;
analyzing the one of the plurality of asynchronous functions against the behavioral type signature to render an evaluation on whether message-passing actions of the one of the plurality of asynchronous functions during execution of the message-passing application program will conform to the message-passing properties specified by the behavioral type signature, wherein the analyzing comprises:
extracting an implementation model of the one of the plurality of asynchronous functions, the implementation model reflecting message-passing actions of the one of the plurality of asynchronous functions during compilation of the message-passing application program; and
checking the implementation model against the behavioral type signature by comparing actions of the implementation model to actions specified in the behavioral type signature to determine whether message-passing related errors are contained in executable code of the one of the plurality of asynchronous functions, wherein the checking comprises: receiving the behavioral type signature specifying the message-passing properties for the one of the plurality of asynchronous functions, receiving the extracted implementation model, and assuming the behavioral type signature does not have parallel composition;
generating a report indicating whether any message-passing related errors exist; and storing in memory an indication of whether the one of the plurality of asynchronous functions conforms to the behavioral type signature.

18. The computer process in the computer storage medium of claim 17, wherein the checking operation comprises:
comparing the message-passing actions of the implementation model against the message-passing properties of the one of the plurality of asynchronous functions.

19. The computer process in the computer storage medium of claim 18, wherein the computer process further comprises:
rendering an evaluation on whether the one of the plurality of asynchronous functions conforms to the behavioral type signature.

20. The computer process in the computer storage medium of claim 19, wherein the rendering operation comprises:
marking the one of the plurality of asynchronous functions as conforming to the behavioral type signature if the message-passing actions of the one of the plurality of asynchronous functions conform to the message-passing properties specified by the associated behavioral type signature; and
marking the one of the plurality of asynchronous functions as failing to conform to the behavioral type signature if the message-passing actions of the one of the plurality of asynchronous functions do not conform to the message-passing properties specified by an associated behavioral type signature.

21. The computer process in the computer storage medium of claim 20, wherein the computer process further comprises:
repeating the defining operation, the extracting operation, the checking operation and one of the two marking operations for each of the plurality of asynchronous functions on the first program module.

22. The computer process in the computer storage medium of claim 19, wherein the checking operation comprises:
determining whether the behavioral type signature specifies an internal choice for performing an action or an external choice for performing an action.

23. The computer process in the computer storage medium of claim 20, wherein the checking operation further comprises:
determining whether the implementation model performs at least one output action specified by the behavioral type signature if it is determined that the behavioral type signature specifies an internal choice; and
marking the evaluation to reflect that the one of the plurality of the asynchronous functions fails to conform to the behavioral type signature if it is determined that the implementation model does not perform at least one output action specified by the behavioral type signature.

24. The computer process in the computer storage medium of claim 23, wherein the checking operation further comprises:
determining whether all actions of the implementation model are actions allowed by the behavioral type signature; and
marking the evaluation to reflect that the one of the plurality of asynchronous functions conforms to the behavioral type signature if it is determined that the implementation model performs at least one output action specified by the behavioral type signature and that all actions of the implementation model are allowed by the behavioral type signature.

25. The computer process in the computer storage medium of claim 22, wherein the checking operation further comprises:

determining whether the implementation model performs all input actions specified by the behavioral type signature if it is determined that the behavioral type signature specifies an external choice; and
marking the evaluation to reflect that the one of the plurality of asynchronous functions fails to conform to the behavioral type signature if it is determined that the implementation model does not perform all input actions specified by the behavioral type signature.

26. The computer process in the computer storage medium of claim 25, wherein the checking operation further comprises:
determining whether all actions of the implementation model are actions allowed by the behavioral type signature; and
marking the evaluation to reflect that the one of the plurality of asynchronous functions conforms to the behavioral type signature if it is determined that the implementation model performs all input actions specified by the behavioral type signature and that all actions of the implementation model are allowed by the behavioral type signature.

27. The computer process in the computer storage medium of claim 17, wherein the message-passing application program operates in a local computing environment as an event-driven application program wherein messages are passed between the first program module and the second program module within the local computing environment.

28. The computer process in the computer storage medium of claim 17, wherein the message-passing application program operates in a distributed computing environment.

29. The computer process in the computer storage medium of claim 28, wherein the first program module is a stage of the message-passing application program containing a collection of two or more of the plurality of asynchronous functions and the second program module is a stage of a second message-passing application program within the distributed computing environment.

30. A method for evaluating behavioral properties of a message-passing application program having a first program module with an asynchronous function that communicates with operations of a second program module, the method comprising:
defining a behavioral type signature for the asynchronous function, the behavioral type signature specifying message-passing properties for the asynchronous function and the behavioral type signature dictating timing of input and output actions by the asynchronous function, and wherein the defining a behavioral type signature comprises determining whether a condition is to be placed in the behavioral type signature;
extracting an implementation model of the asynchronous function, the implementation model reflecting message-passing actions of the asynchronous function during compilation of the message-passing application program;
checking the implementation model against the behavioral type signature by comparing actions of the implementation model to actions specified in the behavioral type signature to determine whether message-passing related errors are contained in executable code of the asynchronous function, wherein the checking comprises: receiving the behavioral type signature specifying the message-passing properties for the asynchronous function, receiving the extracted implementation model, and assuming the behavioral type signature does not have parallel composition;

rendering an evaluation on whether the asynchronous function conforms to the behavioral type signature based on whether the executable code of the asynchronous function contains message-passing related errors;

generating a report indicating whether any message-passing related errors exist, wherein the report includes the evaluation on whether the asynchronous function conforms to the behavioral type signature; and storing the evaluation in memory.

31. The method as defined in claim 30, wherein the rendering operation comprises:

marking the asynchronous function as conforming to the behavioral type signature if conformance exists between the message-passing actions of the implementation model and the message-passing properties specified by the associated behavioral type signature; and marking the asynchronous function as failing to conform to the behavioral type signature if conformance does not exist between the message-passing actions of the implementation model and the message-passing properties specified by the associated behavioral type signature.

32. A system for evaluating behavioral properties of a message-passing application program having a first program module with an asynchronous function that communicates with operations of a second program module, the system comprising:

a memory storing:
 a define module;
 a type checker; and
 computer executable instructions that when executed perform the steps of:
  defining, with the define module, a behavioral type signature for the asynchronous function, the behavioral type signature specifying message-passing properties for the asynchronous function, and the behavioral type signature dictating timing of input and output actions by the asynchronous function, and wherein the defining a behavioral type signature comprises determining whether a condition is to be placed in the behavioral type signature;
  analyzing the asynchronous function against the behavioral type signature to render an evaluation on whether message-passing actions of the asynchronous function during execution of the message-passing application program will conform to the message-passing properties specified by the behavioral type signature, wherein the analyzing comprises:
   extracting, with the type checker, an implementation model of the asynchronous function reflecting message-passing actions of the asynchronous function during compilation of the message-passing application program and checking the message-passing actions of the implementation model against the message-passing properties of the behavioral type signature to determine whether message-passing related errors are contained in executable code of the asynchronous function, wherein the checking comprises:
    receiving the behavioral type signature specifying the message-passing properties for the asynchronous function, receiving the extracted implementation model, and assuming the behavioral type signature does not have parallel composition; and
    generating a report indicating whether any message-passing related errors exist, wherein the report includes the evaluation for the asynchronous function; and a processor for executing the computer executable instructions.

33. The system as defined in claim 32, wherein the asynchronous function is written as executable source code in a first programming language and the behavioral type signature is written in a second programming language.

34. The system as defined in claim 32, wherein the message-passing application program operates in a local computing environment as an event-driven application program, wherein messages are passed between the first program module and the second program module within the local computing environment.

35. The system as defined in claim 34, wherein the first program module is a first stage of the message-passing application program containing a first collection of two or more of a plurality of asynchronous functions and the second program module is a second stage of the message-passing application program containing a second collection of two or more of a plurality of asynchronous functions.

36. The system as defined in claim 32, wherein the message-passing application program operates in a distributed computing environment.

37. The system as defined in claim 36, wherein the first program module is a stage of the message-passing application program containing the asynchronous function and the second program module is a stage of a second message-passing application program within the distributed computing environment.

* * * * *

UNITED STATES PATENT AND TRADEMARK OFFICE
CERTIFICATE OF CORRECTION

| | | |
|---|---|---|
| PATENT NO. | : 7,703,077 B2 | |
| APPLICATION NO. | : 10/136596 | |
| DATED | : April 20, 2010 | |
| INVENTOR(S) | : Jakob Rehof et al. | |

It is certified that error appears in the above-identified patent and that said Letters Patent is hereby corrected as shown below:

In column 17, line 14, delete "Function" and insert -- function --, therefor.

In column 17, line 28, after "function" delete "on".

In column 18, line 52, after "function f" insert -- . --.

In column 18, line 65, delete "f" and insert -- f, --, therefor.

In column 20, line 32, delete "fifty" and insert -- fifth --, therefor.

In column 24, line 13, in Claim 15, delete ".a" and insert -- a --, therefor.

In column 26, line 46, in Claim 30, delete "function" and insert -- function, --, therefor.

Signed and Sealed this
Eighth Day of February, 2011

David J. Kappos
*Director of the United States Patent and Trademark Office*